(12) United States Patent
Nakamura

(10) Patent No.: US 8,001,936 B2
(45) Date of Patent: Aug. 23, 2011

(54) CONTROL APPARATUS FOR INTERNAL COMBUSTION ENGINE AND CONTROL METHOD THEREFOR

(75) Inventor: Makoto Nakamura, Isehara (JP)

(73) Assignee: Hitachi, Ltd., Tokyo (JP)

( * ) Notice: Subject to any disclaimer, the term of this patent is extended or adjusted under 35 U.S.C. 154(b) by 582 days.

(21) Appl. No.: 12/213,191

(22) Filed: Jun. 16, 2008

(65) Prior Publication Data
US 2009/0007866 A1  Jan. 8, 2009

(30) Foreign Application Priority Data

Jul. 4, 2007 (JP) ................................ 2007-175718
Sep. 3, 2007 (JP) ................................ 2007-227435

(51) Int. Cl.
  *F01L 1/34* (2006.01)
(52) U.S. Cl. .................. 123/90.16; 123/90.17; 123/346
(58) Field of Classification Search ............... 123/90.15, 123/90.16, 90.17, 90.18, 345, 346, 347, 348
See application file for complete search history.

(56) References Cited

U.S. PATENT DOCUMENTS

| | | | |
|---|---|---|---|
| 6,502,537 B2 | 1/2003 | Todo et al. | |
| 6,550,437 B2 | 4/2003 | Nakamura et al. | |
| 6,705,257 B2 | 3/2004 | Shimizu | |
| 6,840,235 B2 | 1/2005 | Koseki et al. | |
| 7,159,545 B2 | 1/2007 | Miyakoshi et al. | |
| 7,159,548 B2 | 1/2007 | Shindou | |
| 7,246,581 B2 | 7/2007 | Suga et al. | |
| 7,246,594 B2 * | 7/2007 | Hartmann | 123/198 F |
| 7,322,324 B2 | 1/2008 | Hara et al. | |
| 7,357,119 B2 | 4/2008 | Yoshida et al. | |
| 7,406,935 B2 | 8/2008 | Suga et al. | |
| 7,594,487 B2 | 9/2009 | Okamoto | |
| 7,827,949 B2 | 11/2010 | Suga et al. | |
| 2005/0211204 A1 | 9/2005 | Todo et al. | |
| 2007/0163524 A1 | 7/2007 | Muraji et al. | |

FOREIGN PATENT DOCUMENTS

JP 6-235307 A 8/1994
(Continued)

OTHER PUBLICATIONS

U.S. Appl. No. 12/076,172, filed Mar. 14, 2008, Nakamura.
U.S. Appl. No. 12/131,460, filed Jun. 2, 2008, Nakamura et al.
Makoto Nakamura, USPTO Office Action, U.S. Appl. No. 12/076,172, Feb. 7, 2011, 14 pages.
(Continued)

*Primary Examiner* — Ching Chang
(74) *Attorney, Agent, or Firm* — Foley & Lardner LLP

(57) ABSTRACT

In a control apparatus and a method for an internal combustion engine, a first cylinder group in which both of the intake and exhaust valves of each of the engine cylinders thereof are controllably stopped; and a second cylinder group in which a lift of the intake valve of each of the engine cylinders thereof is variably controlled are provided. The lift of the intake valve of each of the engine cylinders of the second cylinder group is controlled in order for an engine torque when the intake and exhaust valves of each of the cylinders of the first cylinder group are controlled to be stopped to be approximately equal to the engine torque by the first cylinder group and the second cylinder group before the intake and exhaust valves of each of the cylinders of the first cylinder group are controlled to be stopped.

20 Claims, 14 Drawing Sheets

FOREIGN PATENT DOCUMENTS

| | | |
|---|---|---|
| JP | 10-008935 A | 1/1998 |
| JP | 10-082334 A | 3/1998 |
| JP | 2002-227615 A | 8/2002 |
| JP | 2002-256832 A | 9/2002 |
| JP | 2003-172112 A | 6/2003 |
| JP | 2004-076618 A | 3/2004 |
| JP | 2004-156508 A | 6/2004 |
| JP | 2006-70726 A | 3/2006 |
| JP | 2006-200391 A | 8/2006 |

OTHER PUBLICATIONS

Makoto Nakamura, USPTO Office Action, U.S. Appl. No. 12/076,172, Aug. 24, 2010, 14 pages.

Makoto Nakamura, USPTO Notice of Allowance, U.S. Appl. No. 12/131,460, May 14, 2010, 8 pages.

\* cited by examiner

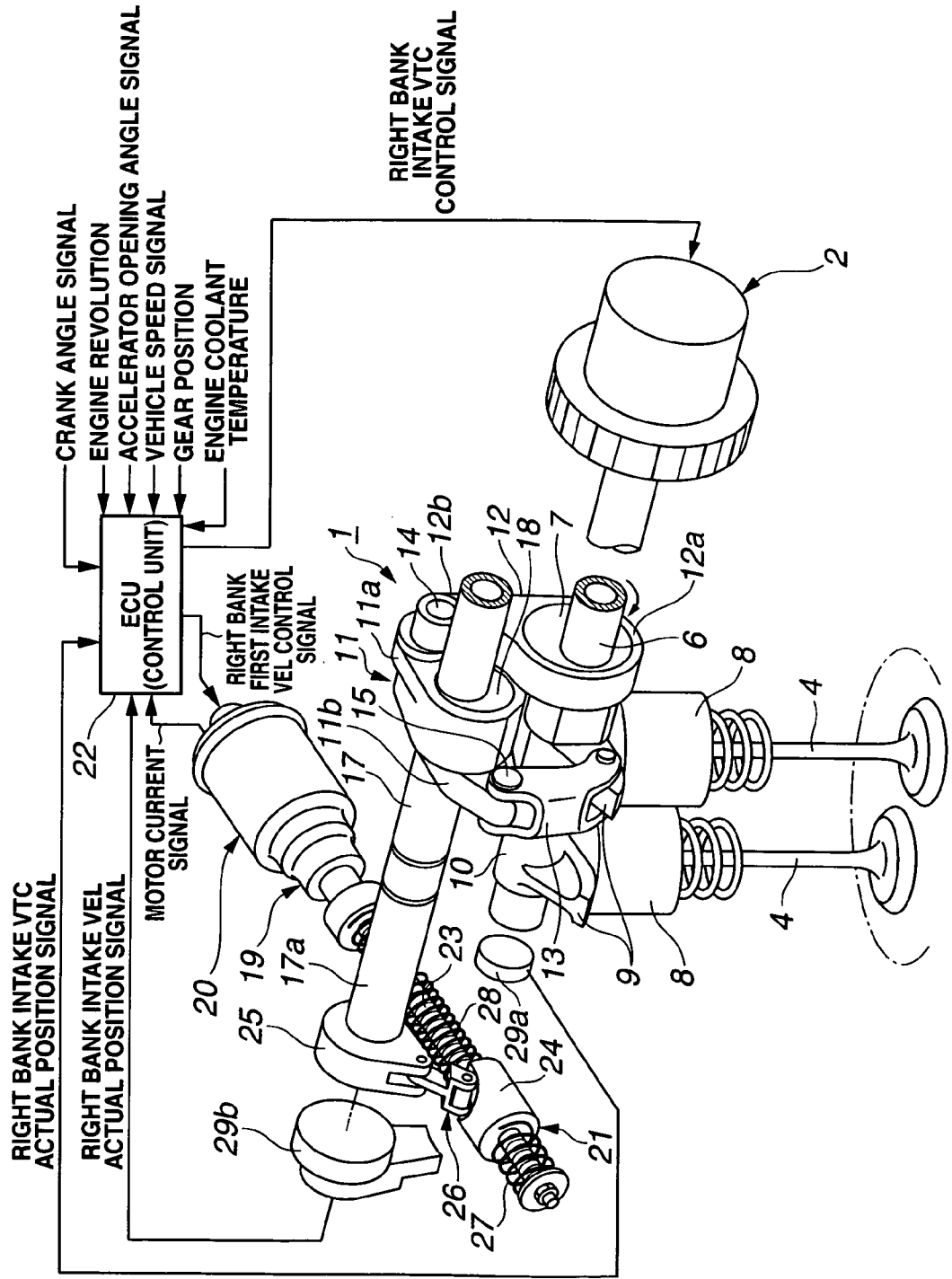

CONTROL APPARATUS FOR INTERNAL COMBUSTION ENGINE AND CONTROL METHOD THEREFOR

BACKGROUND OF THE INVENTION (1) Field of the Invention

The present invention relates generally to a control apparatus for an internal combustion engine and a control method therefor. The present invention relates particularly to the control apparatus for the internal combustion engine and the control method therefor which are capable of improving a fuel economy and capable of suppressing a torque shock to be developed when an engine driving region is transferred to a partial cylinder halt (reduced cylinder) driving region in which operations of intake and exhaust valves of a given part of cylinders of the engine mounted in an automotive vehicle are temporarily stopped (stopped in closed states) (so-called, a cylinder halt).

(2) Description of Related Art

A Japanese Patent Application Publication No. Heisei 10-82334 published on Mar. 31, 1998 exemplifies a previously proposed engine control apparatus which can perform the cylinder halt described above. In the above-described Japanese Patent Application Publication, the control apparatus includes: a hydraulic cylinder halt mechanism configured to switch between a drive mode in which all of a plurality of engine cylinders are operated and another drive mode in which operations of the given part of the plurality of engine cylinders are halted (the cylinder halt drive is carried out); a solenoid valve configured to control a supply or an interruption (cut off) of a hydraulic pressure to the hydraulic cylinder halt mechanism; and a control unit configured to control a drive of the solenoid valve, the control unit setting a drive timing of the solenoid valve on the basis of engine driving condition detecting means.

Thus, the cylinder halt mechanism is operated at an appropriate timing to perform the cylinder halt and to release the cylinder halt.

SUMMARY OF THE INVENTION

However, in the previously proposed control apparatus for the internal combustion engine disclosed in the above-described Japanese Patent Application Publication (No. Heisei 10-82334), it may be thought that an opening angle (quantity) of an engine throttle valve is largely varied to suppress a development of a torque stepwise difference when the switching between the all cylinder driving region and the partial cylinder halt driving region is carried out in a stepwise manner.

Because the fact that a variation of number of working cylinders results in a remarkable change in an intake air quantity is needed to be absorbed by a large variation of the opening angle (quantity) of the opening angle variable of the engine throttle valve. Therefore, during the all cylinder driving region in which the opening angle variable of the engine throttle valve is controlled to be small (narrow), a pumping loss due to a negative pressure within an intake manifold of the engine is easy to be developed and, consequently, the fuel economy becomes largely worsened.

In addition, when the engine driving region is transferred to the partial cylinder halt driving region, in order to enhance an output engine torque by means of the working cylinders, the opening angle (quantity) of the engine throttle valve is controlled to be relatively large to increase the intake air quantity per cylinder, thus suppressing the development of the torque stepwise difference.

However, in this case, the load of the engine is always varied. In order to cope with this load variation, the engine throttle valve cannot help being controlled to a middle opening angle (quantity) not to a completely open state. Therefore, the pumping loss cannot sufficiently be reduced and it may be thought that, even under this driving state, the fuel economy performance cannot sufficiently be improved.

Furthermore, a torque lift stepwise difference between the all cylinder working driving region and the cylinder halt driving region is considered. Since an inner cylinder (internal cylinder) of the intake manifold is largely varied before and after the variation of the opening angle variable of the engine throttle valve, the torque stepwise difference occurs for an instant time until this variation is ended and there is a possibility of the torque shock being left.

It is, hence, an object of the present invention to provide improved control apparatus for an internal combustion engine and control method therefor which are capable of improving the fuel economy and of suppressing the torque shock when the engine driving region is transferred to the cylinder halt driving region in which operations of intake and exhaust valves of the given part of cylinders of the engine mounted in the automotive vehicle are stopped.

According to one aspect of the present invention, there is provided a control apparatus for an internal combustion engine, comprising: a first cylinder group in which both of intake and exhaust valves of each of engine cylinders thereof are controllably stopped; a second cylinder group in which a lift of the intake valve of each of the engine cylinders thereof is variably controlled; and a controller configured to control the lift of the intake valve of each of the engine cylinders of the second cylinder group in order for an engine torque when the intake and exhaust valves of each of the cylinders of the first cylinder group are controlled to be stopped to be approximately equal to the engine torque by means of the first cylinder group and the second cylinder group before the intake and exhaust valves of each of the cylinders of the first cylinder group are controlled to be stopped.

According to another aspect of the present invention, there is provided a control apparatus for an internal combustion engine, comprising:
a first control mechanism configured to perform a valve stop control for intake and exhaust valves of each of engine cylinders of a first cylinder group; and a second control mechanism configured to perform a variable control for a lift of the intake valve of each of the engine cylinders of a second cylinder group, wherein, when the first control mechanism performs the valve stop control of the intake and exhaust valves of each of engine cylinders of the first cylinder group, the second control mechanism performs the lift of the intake valve of each of the engine cylinders of the second cylinder group to maintain an engine torque by means of the first and second cylinder groups before the valve stop control performed by the first control mechanism.

According to a still another aspect of the present invention, there is provided a control apparatus for an internal combustion engine, comprising: a first lift variable mechanism configured to approximately zero lifts of both of intake and exhaust valves of a first cylinder group to perform a valve stop control for the intake and exhaust valves of each of engine cylinders of the first cylinder group; and a second lift variable mechanism configured to perform a continuously variable control for the lift of the intake valves of each of the engine cylinders of an all time working second cylinder group and wherein the second lift variable mechanism performs the continuously variable control for the lift of the intake valve of each of the cylinders of the second cylinder group to be increased in order to maintain a variation of an engine torque before and after a zero lift control of the lifts of the intake and exhaust valves of each of the engine cylinders of the first cylinder group is performed by the first lift variable mechanism at a value equal to or smaller than a predetermined value, when the first lift variable mechanism zeroes the lifts of the intake and exhaust valves of each of the cylinders of the first cylinder group to perform the zero lift control.

According to a further another aspect of the present invention, there is provided a control method for the internal combustion engine, comprising: providing a first cylinder group in which both of intake and exhaust valves of each of engine cylinders thereof are controllably stopped; providing a second cylinder group in which a lift of the intake valve of each of the engine cylinders thereof is variably controlled; and controlling the lift of the intake valve of each of the engine cylinders of the second cylinder group in order for an engine torque when the intake and exhaust valves of each of the cylinders of the first cylinder group are controlled to be stopped to be approximately equal to the engine torque by means of the first cylinder group and the second cylinder group before the intake and exhaust valves of each of the cylinders of the first cylinder group are controlled to be stopped.

This summary of the invention does not necessarily describe all necessary features so that the invention may also be a sub-combination of these described features. The other objects and features of this invention will become understood from the following description with reference to the accompanying drawings.

BRIEF DESCRIPTION OF THE DRAWINGS

FIG. 2 is a perspective view representing a first intake VEL and a first intake VTC used in the control apparatus for the internal combustion engine in the first embodiment shown in FIG. 1.

DETAILED DESCRIPTION OF THE INVENTION

Reference will hereinafter be made to the drawings in order to facilitate a better understanding of the present invention. A gasoline-specified V-type six-cylinder internal combustion engine to which a control apparatus in each of preferred embodiments is applicable will chiefly be described below.

First Embodiment

An outline of a whole structure of the V-type internal combustion engine will be described on a basis of FIG. 1. While a three-cylinder right bank RB which corresponds to a first cylinder group provides a (operation) halt enabled cylinder group, a three-cylinder left bank LB which corresponds to a second cylinder group provides an operation enabled cylinder group working at all times.

Figure 1:
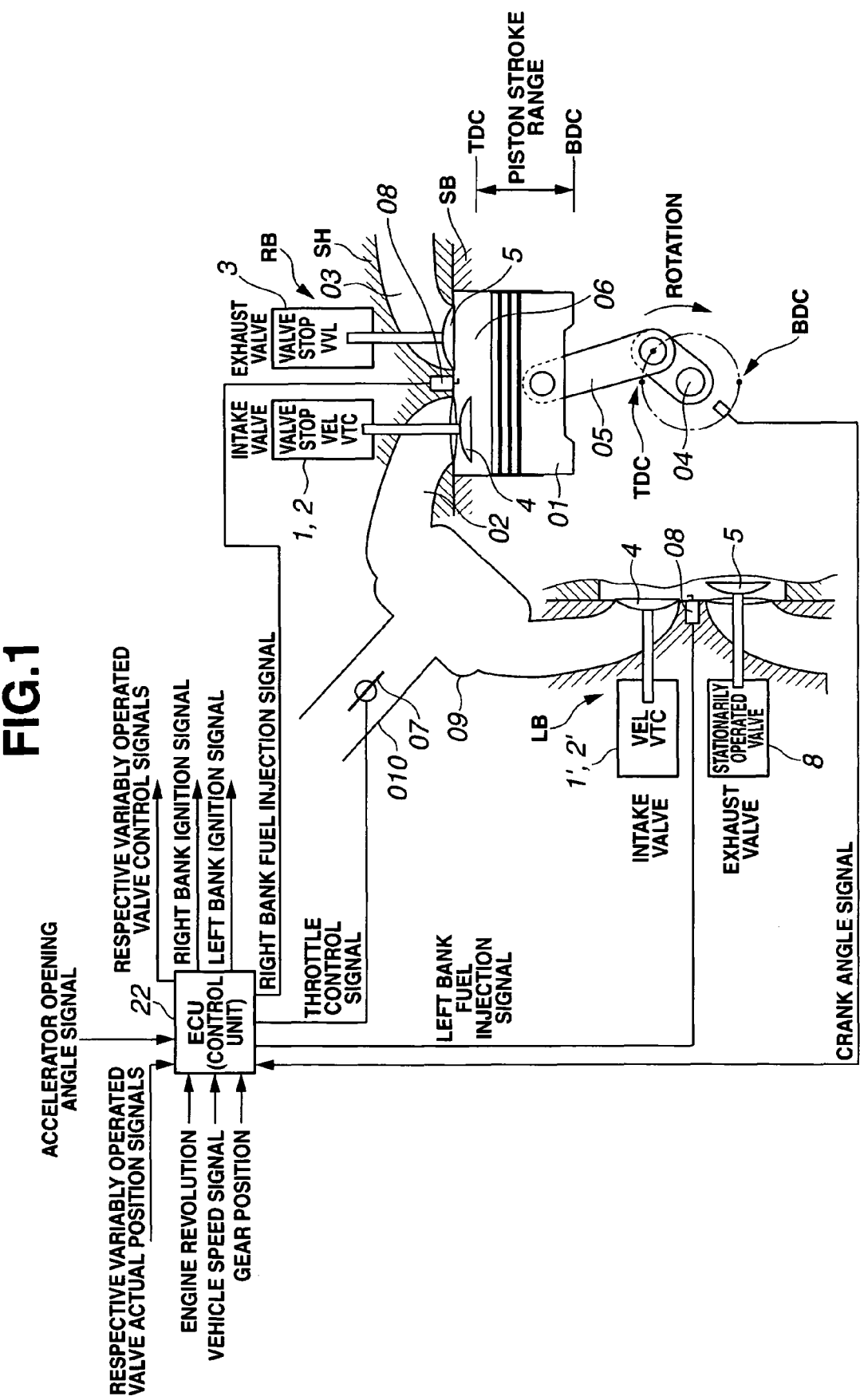
FIG. 1 is a schematic configuration view of an internal combustion engine to which a control apparatus in a first preferred embodiment is applicable.

In addition, the internal combustion engine shown in FIG. 1 includes two intake valves 4, 4 and exhaust valves 5, 5 for the respective cylinders. Right bank RB includes: a first intake VEL (Valve Event and Lift) 1 which is an intake side lift (quantity) variable mechanism used to variably control a valve lift (quantity) of intake valves 4, 4 of each of the cylinders of the right bank; a first intake VTC (Variable Timing Control) 2 which is an intake side lift-and-phase variable mechanism used to variably control valve-open-and-closure timings of intake valves 4, 4 of each of the cylinders of right bank RB; and an exhaust VVL (Variably Valve Lift) 3 which is an exhaust side lift variable mechanism which variably controls valve lift quantity of exhaust valves 5, 5. It should be noted that first intake VEL 1, first intake VTC 2, and exhaust VVL 3 perform a valve stop control for each of intake valves 4, 4 and exhaust valves 5, 5 of right bank RB in accordance with an engine driving condition.

On the other hand, left bank LB includes: a second intake VEL 1'; and a second intake VTC 2', both of second intake VEL 1' and VTC 2' variably controlling valve lift and valve open-and-closure timings of intake valves 4, 4. It should be noted that exhaust valves 5, 5 of left bank LB are ordinary stationarily (fixedly) operated valve device 8 which fixedly controls the lift (quantity) of exhaust valves 5, 5 of each of the cylinders of left bank LB.

Hereinafter, a specific structure of the internal combustion engine will be explained. The internal combustion engine includes: a piston 01 disposed within a cylinder bore formed within a cylinder block SB so as to enable a slidable motion thereof in an upward-and-lower direction; an intake port 02 and an exhaust port 03 formed respectively within an inner part of cylinder head SH; and respective intake valves 4, 4 and exhaust valves 5, 5 installed slidably on cylinder head SH and which perform open-and-closures of opening ends of intake and exhaust ports 02, 03.

Piston 01 is linked to a crankshaft 04 via a connecting rod 05 and a combustion chamber 06 is formed between a crown surface of piston 01 and a lower surface of cylinder head SH.

A throttle valve 07 is disposed on an inner part of an intake pipe 010 located at an upstream side of an intake manifold 09 to branch intake air (air mixture fuel) into each intake port 02 to supplementally control an intake air quantity mainly for the purpose of safety. A fuel injection valve 08 is installed on cylinder head SH in order to directly inject fuel into combustion chamber 06.

First intake VEL 1 of right bank RB continuously controls the valve lift quantity of intake valves 4, 4 of each of the cylinders of right bank RB from a zero lift (viz., a valve stop) to a maximum lift (quantity). A specific structure of first intake VEL 1 is exemplified by a Japanese Patent Application First Publication (tokkai) No. 2004-076618 published on Mar. 11, 2004. A brief explanation of the specific structure of first intake VEL 1 will be described below.

As shown in FIG. 2, first intake VEL 1 includes a hollow drive shaft 6 rotatably supported on a bearing on an upper portion of cylinder head SH; a drive cam 7 which is an eccentric rotary cam fixedly disposed on drive shaft 6 through a press fitting; valve lifters 8, 8 disposed on upper end portions of respective intake valves 4, 4; two swing cams 9, 9 swingably supported on an outer peripheral surface of drive shaft 6 so as to be slidably contacted on upper surfaces of valve lifters 8, 8 to operate respective intake valves 4, 4 to be open; and a transmission mechanism interlinked between drive cam 7 and swing cams 9, 9 to transmit a rotating force of drive cam 7 as swing forces of swing cams 9, 9. The rotating force is transmitted from the crankshaft of the engine to drive shaft 6, the rotating force being set in a clockwise direction (an arrow-marked direction) as shown in FIG. 2.

Drive cam 7 is substantially of a ring shape and penetrated through drive shaft 6 via a drive shaft inserting hole formed in an inner axial direction. In addition, an axial center of a cam main frame is offset by a predetermined quantity from an axial center of drive shaft 6.

Both swing cams 9, 9 are of substantially raindrop shapes in the mutually same profiles as shown in FIGS. 3A, 3B, and 4A, 4B (FIGS. 3A, 3B, 4A, and 4B show rear views of both swing arms 9, 9). Both swing alms 9, 9 are integrally installed on both ends of annular camshaft 10. Camshaft 10 is rotatably supported on drive shaft 6 via its inner peripheral surface of camshaft 10. In addition, cam surfaces 9a of both swing arms 9, 9 are formed on its lower surface of respective swing cams 9, 9. Each of cam surfaces 9a is formed of: a basic circular surface faced toward an axial side of camshaft 10; a ramp surface extending in an arc shape from the basic circular surface toward a cam nose portion side; and a lift surface extended on a vertex surface of a maximum lift provided on a tip end of the cam nose portion. At least one or more of the basic circular surface, the ramp surface, and the lift surface are contacted on a predetermined position of the upper surface of each of valve lifters 8, 8.

The transmission mechanism includes: a rocker arm 11 disposed on an upper part of drive shaft 6; a link arm 12 interlinked between one end part 11a of rocker arm 11 and drive cam 7; and a link rod 13 interlinked between the other end of rocker arm 11 and swing cams 9, 9.

Rocker arm 11 has a cylindrical basic part at its center portion rotatably supported on a control cam 18 as will be described later via a supporting hole. One end 11a of rocker arm 11 is rotatably linked to a link arm 19 through a pin 14 and the other end 11b thereof is rotatably linked to one end 13a of link rod 13 through a pin 15.

Link arm 12 is formed with a fitting hole on which the cam main frame of drive cam 7 is rotatably fitted at a center position of relatively large-diameter annular basic part 12a and a projection end 12b of rocker arm 12 is linked to one end 11a of rocker arm 11 through pin 14.

Link rod 13 has the other end 13b rotatably linked to a cam nose portion of each swing arm 9 via a pin 16.

In addition, a control shaft 17 is rotatably supported on the same bearing at an upper position of drive shaft 6 and a control cam 18 which provides a swing fulcrum of rocker arm 11 is fixed on an outer periphery of control shaft 17. One end 11a of rocker arm 11 is rotatably linked to link arm 12 through pin 14 and the other end 11b is rotatably linked to one end 13a of link rod 13 through pin 15.

Control shaft 17 is disposed in the engine forward-and-backward direction in parallel to drive shaft 6 and is rotatably controlled by means of a drive mechanism 19. On the other hand, control cam 18 is of a cylindrical shape and is offset by a predetermined quantity (distance) from an axial center of control shaft 17.

Drive mechanism 19 includes: an electric motor 20 fixed on one end of a housing (not shown); and ball screw transmitting portion 21 transmitting a rotation drive force of electric motor 20 to control shaft 17.

Electric motor 20 is constituted by a proportional type DC motor and is driven in response to a control signal from a control unit 22 (ECU), as will be described later, which detects a vehicle state including an engine driving condition (state).

Ball screw transmitting portion 21 mainly includes a ball screw shaft 23 arranged approximately coaxially with a drive shaft of electric motor 20; a ball nut 24 which is a movement member screwed onto an outer periphery of ball screw shaft 23; a linkage arm 25 linked to one end portion of control shaft 17 along a diameter direction of control shaft 17; and a link member 26 to link linkage arm 25 with ball nut 24.

A ball circular groove having a predetermined width is spirally and continuously formed on ball screw shaft 23 except both ends thereof. One end of ball screw shaft 23 is linked to the drive shaft of electric motor 20 and this linkage of ball screw shaft 23 to the drive shaft of electric motor 20 allows the transmission of the rotational driving force of electric motor 20 to ball screw shaft 23 and allows a slight motion of ball screw shaft 23 in an axial direction of ball screw shaft 23.

Ball nut 24 is formed substantially in a cylindrical shape. A guide groove is spirally and continuously formed which holds rollably a plurality of balls together with the ball circular groove on an inner peripheral surface of ball nut 24. An axial movement force is provided for ball nut 24 while a rotational motion of ball screw shaft 23 is converted into a linear motion of ball nut 24 via each ball. In addition, this ball nut 24 is, as shown in FIG. 2, structured in such a manner that both mutually opposed spring forces of a first coil spring 27 elastically installed on a front end of ball screw shaft 23 and a second coil spring 28 elastically installed on a rear end of ball screw shaft 23 are acted upon each other. Hence, after a failure occurs or an ordinary engine halt occurs, even if ball nut 24 is stopped at any position, both coil springs 27, 28 hold ball nut 24 at a middle position in the axial direction (not zero lift position). Thus, engine startability can be secured. Since this position is not the maximum lift control position, a friction of the valve operated device becomes small and this is not the maximum control position. In addition, a cranking torque can be small. Furthermore, more favorable startability can be obtained.

Control unit 22 detects the present engine driving condition on a basis of input signals from angle detection sensors 29a, 29a' detecting a revolution angle (actual position of left and right bank first and second intake VEL 1, VEL 1') and from angle detection sensors 29b, 29b' detecting the revolution angle (actual position of first and second intake VTC 2, VTC 2' for the left and right banks) and outputs intake valve lift control currents to electric motors 20, 20' in addition to a crank angle signal, an engine revolution (number signal), an accelerator opening angle signal, a vehicle speed signal, a gear position signal, and so forth from other various sensors. In addition, control unit 22 outputs control currents to a switching control valve 43 (as will be described later) of exhaust VVL described above, electric motor 20' (as will be described later) of second intake VEL 1', and an electromagnetic coil (as will be described later) of second intake VTC 2' in accordance with the engine driving condition described above.

Hereinafter, an example of an operation of first intake VEL 1 will briefly be described. First of all, for example, during a predetermined light load at which an idling drive after an engine start is carried out, a (revolution) torque transmitted in response to the control signal from control unit 22 to electric motor 20 is transmitted to ball screw shaft 23 to be revolved. Ball screw shaft 23 revolved causes ball nut 24 to be moved linearly in a given direction. Thus, control shaft 17 is revolved in this one direction via linkage member 26 and linkage arm 25.

Figure 3A:
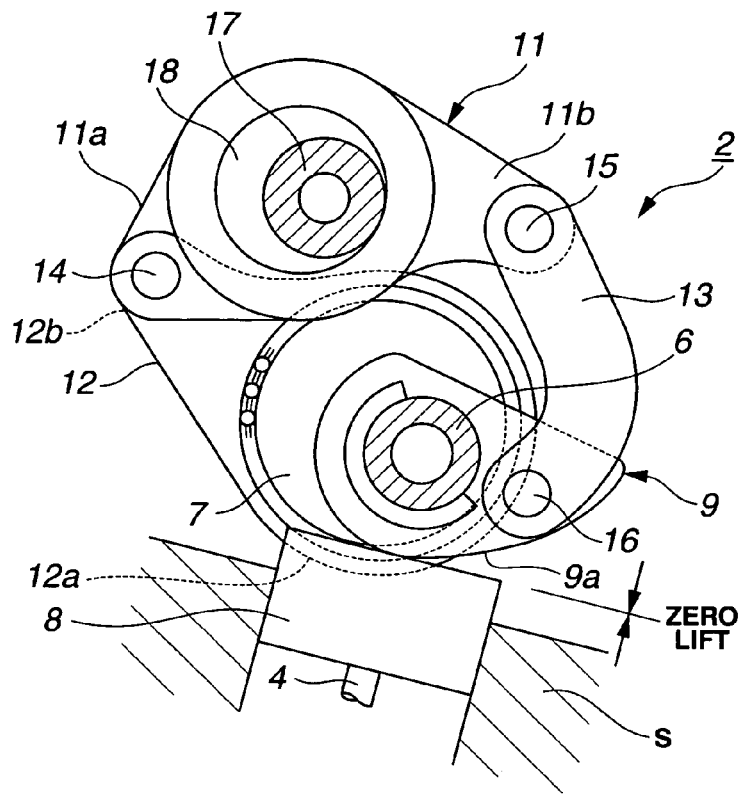
FIGS. 3A and 3B are explanatory views for explaining an operation of the control apparatus in the first embodiment during a zero lift control by means of the first intake VEL shown in FIG. 2.
Figure 3B:
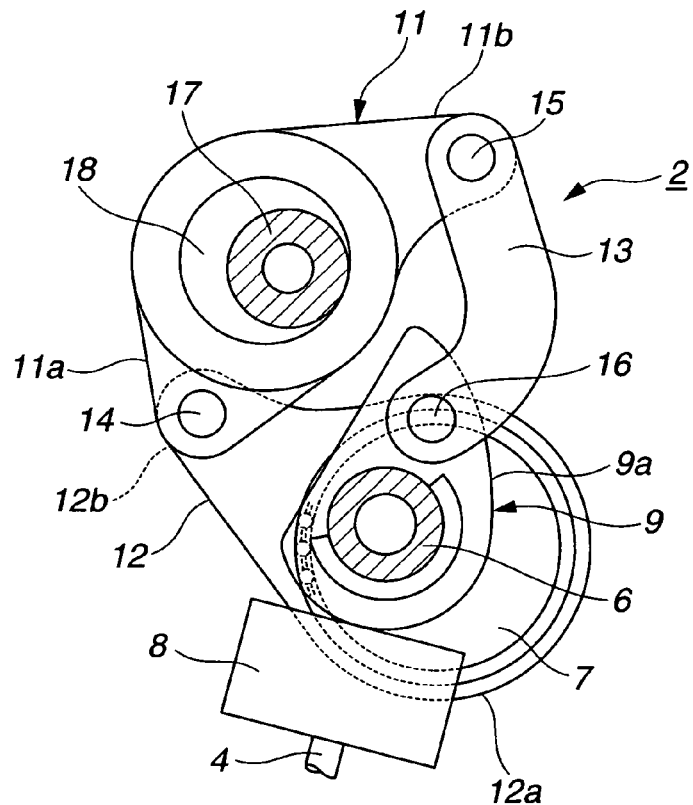

Hence, a (axial) center of control cam 18 is revolved with the same radius about the (axial) center of control shaft 17, as shown in FIGS. 3A and 3B, so that a thickness portion of control cam 18 is moved in an upper direction so as to be spaced apart from drive shaft 6. A pivot of other end portion 11b of rocker arm 11 and link rod 13 is moved in the upper direction with respect to drive shaft 6. Thus, each of swing cams 9, 9 is wholly pivoted in the clockwise direction with the cam nose portion of the swing cam 9 forcefully pulled up via link rod 13.

If drive cam 7 is revolved in order for one end portion 11a of rocker arm 11 to be pushed up via link arm 12, a valve lift (quantity) at this time is transmitted to swing cam 9 and valve lifter 8 via link rod 13. The lift (quantity) at this time provides a predetermined small lift (Lr2) as shown in a left side of FIG. 8.

During a low-or-middle load of the engine such as a steady state driving, the (revolution) torque transmitted to electric motor 20 in response to the control signal from control unit 22 is transmitted to ball screw shaft 23 to be revolved in the same direction as described above. At this time, ball nut 24 is furthermore moved in a maximum given direction. Thus, control shaft 17 is furthermore revolved in the same given direction via linkage member 26 and linkage arm 25.

Hence, control cam 18 is revolved at the same radius about the (axial) center of control shaft 27 so that the thickness portion of control cam 18 is furthermore moved in the upper direction to be spaced apart from drive shaft 6. Thus, the pivots of link rod 13 and other end portion 11b of rocker arm 11 are moved in the upper direction with respect to drive shaft 6 so that the cam nose portion of the swing cam 9 is pulled up via link rod 13 in order for the whole respective swing cams 9, 9 to be furthermore pivoted in the clockwise direction.

Thus, if drive cam 7 is revolved in order for one end portion 11a of rocker arm 11 to be pushed up in the upper direction via link arm 12, its valve lift (quantity) at this time is transmitted to corresponding swing cam 9 and corresponding valve lifter 8 via link rod 13. The lift (quantity) at this time indicates a zero lift as shown in FIGS. 3A and 3B and a right-upper side of FIG. 8. Thus, intake valves 4, 4 are in a valve halted (rested) state (in a completely closed state). It should be noted that the valve halted state indicates a state such that a fuel injection is not carried out through a fuel injection valve 08 within the corresponding cylinder, a corresponding spark plug is not ignited, and an output torque is not developed from the corresponding cylinder. It should also be noted that the exhaust valves 5, 5 of the corresponding cylinder are controlled to provide the zero lift by means of exhaust VVL 3.

Figure 4A:
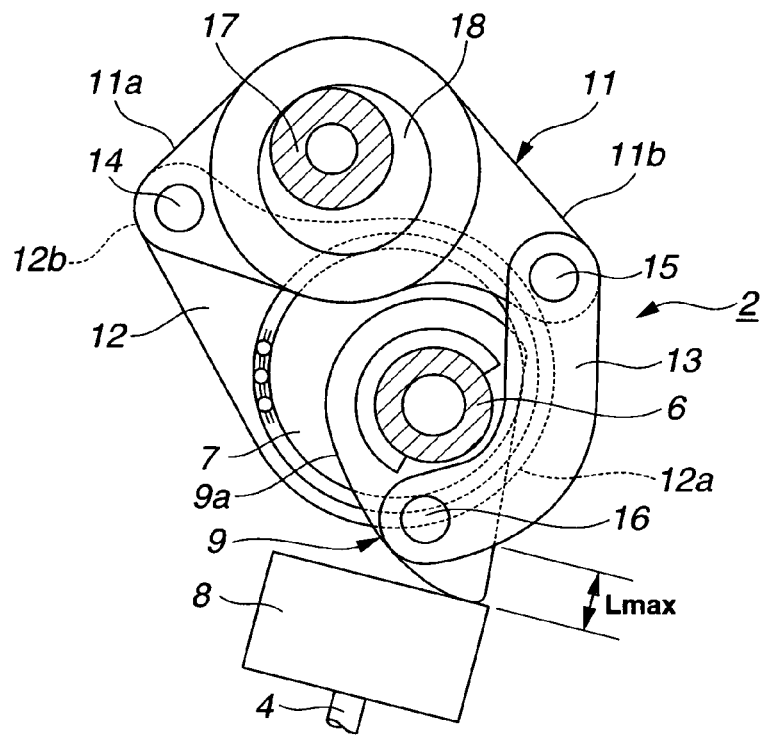
FIGS. 4A and 4B are explanatory views for explaining the operation of the control apparatus in the first embodiment during a large lift control by means of the same first intake VEL shown in FIG. 2.
Figure 4B:
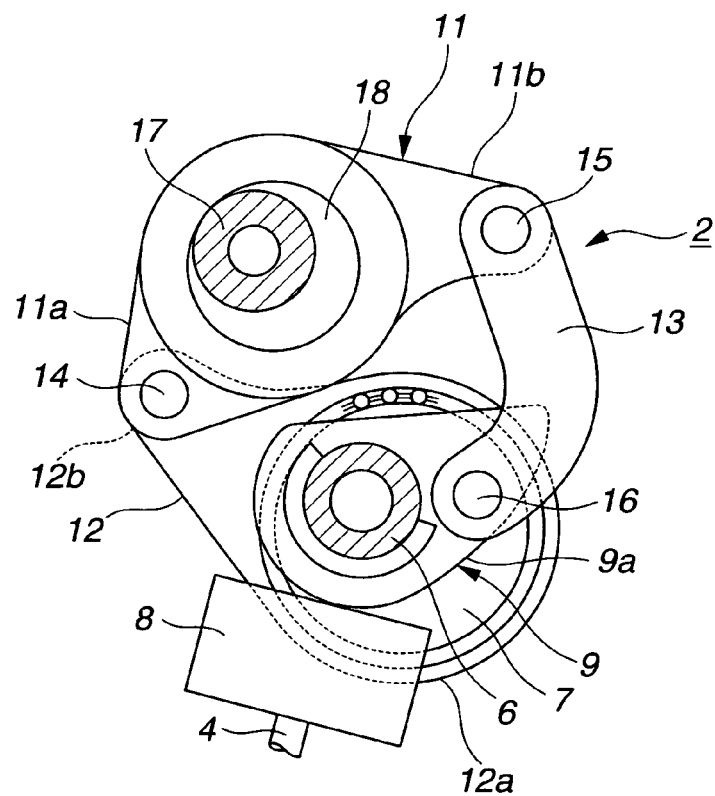

Next, in a case where the engine driving condition is transferred from the low-or-middle load driving region to a high-load-and-high-revolution region, the control signal from control unit 22 causes electric motor 20 to be revolved in the reverse direction. If this revolution torque is transmitted to ball screw shaft 23 to be revolved, this revolution involves ball nut 24 to be moved in the straight line direction toward the opposite direction. Hence, control cam center, as typically shown in FIGS. 4A and 4B, is pivoted toward a downward direction. Hence, whole rocker arm 11 is, in turn, moved toward the direction of drive shaft 6 so that other end portion 11b presses nose cam portion of respective swing cams 9, 9 downward in order for the whole swing cams 9, 9 to be pivoted in the clockwise direction by a predetermined quantity.

Thus, drive cam 7 is revolved to push up one end portion 11a of rocker arm 11 via link arm 12. The valve lift (quantity) at this time is transmitted to corresponding swing cam 9 and valve lifter 8 via link rod 13. The lift (quantity) becomes speedily larger from zero lift side to the maximum lift (quantity) side.

That is to say, the lift (quantity) of intake valves 4, 4 in right bank RV is switched from Lr2 to zero lift (quantity) when the driving region is transferred from the light load (non-load) region to the low-or-middle load region and, furthermore, in the high-load-and-high-revolution region, the maximum lift side is switchingly controlled. However, these series of control is continuously executed.

It should be noted that throttle valve 07 is maintained substantially at the completely open state so that a required air quantity for combustion chamber 06 is mainly controlled by means of first intake VEL 1 and second intake VEL 1'.

First intake VTC 2 utilizes a well-known valve timing control device in which a hysterisis brake (an example of an electromagnetic actuator) is used and disclosed in Japanese Patent Application First Publication No. 2004-156508 published on Jun. 3, 2004.

That is to say, assembly angle modifying means for modifying an assembly angle of a drive ring located for the crankshaft with respect to driven shaft member located for drive shaft 6 is interposed between the drive ring and the driven shaft member and is controlled in accordance with the state of the vehicle including the engine driving condition. In details, a control current is outputted to the electromagnetic coil from control unit 22 to actuate the hysterisis brake to control the lift phase of intake valves 4, 4, viz., open-and-closure timings of intake valves 4, 4 of each of the cylinder of the right bank RB toward an advance angle side or retardation angle side. The VTC used in the present invention is not limited to the hysterisis brake used valve timing control device but may be a hydraulically operated vane type valve timing device which hydraulically controls the lift phase.

Figure 5:
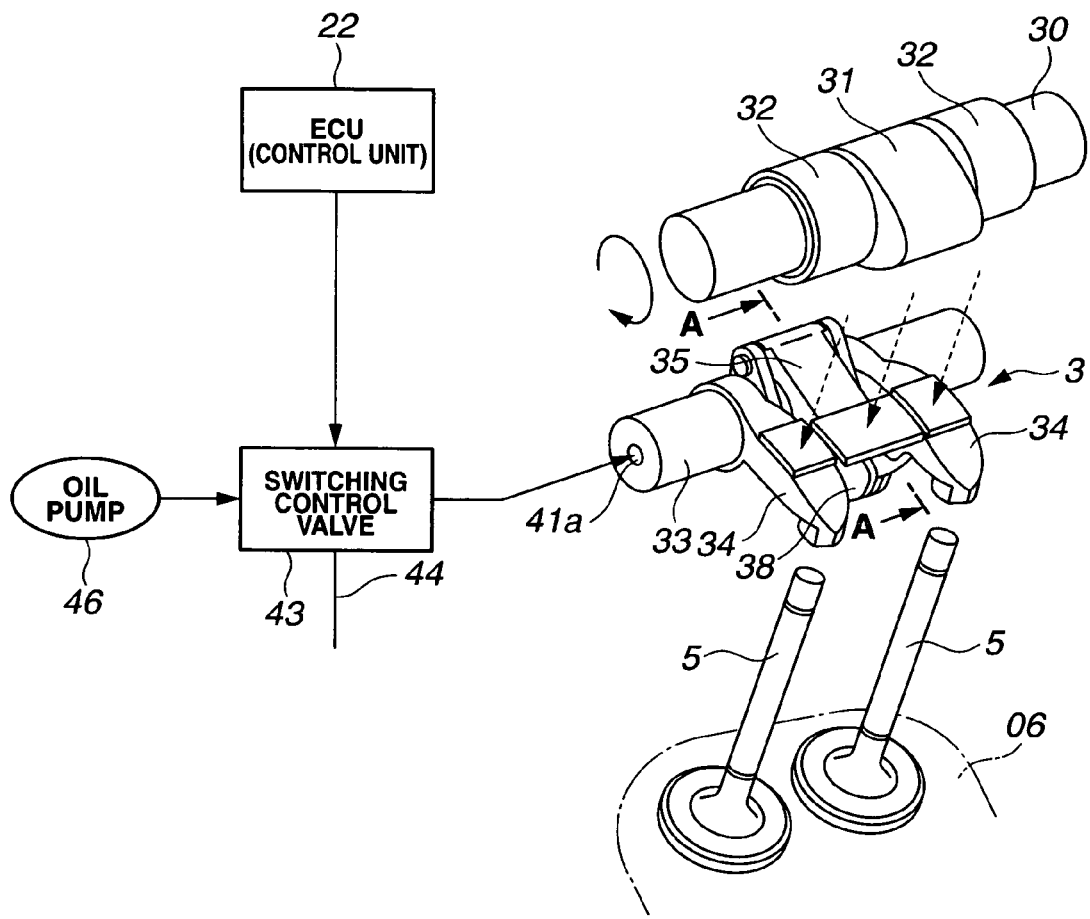
FIG. 5 is a perspective view representing an exhaust VVL used in the first embodiment shown in FIG. 1.
Figure 6A:
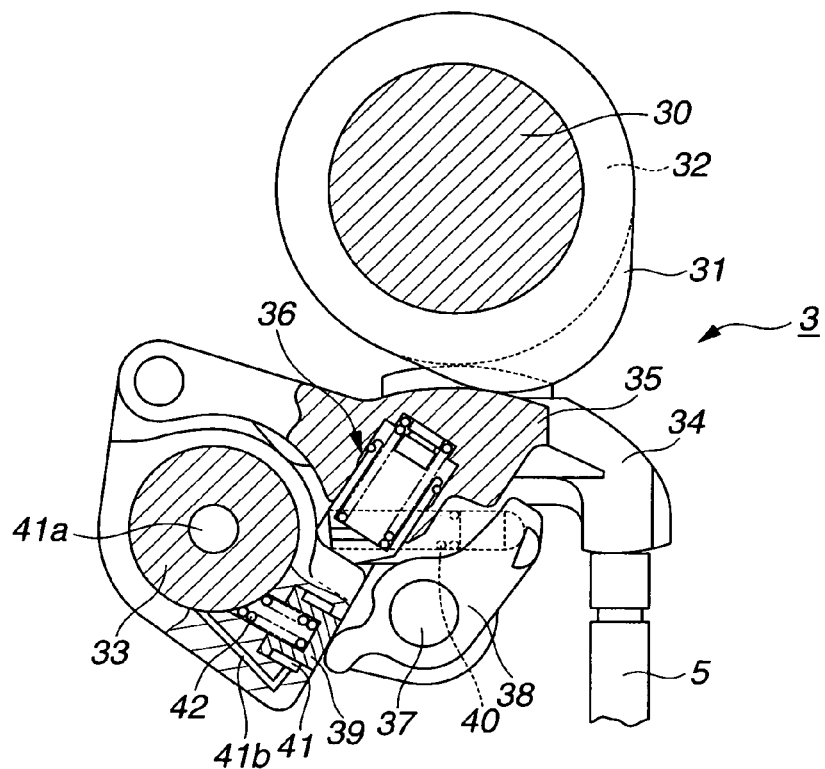
FIGS. 6A and 6B are explanatory view for explaining an operation during the zero lift control by means of the exhaust VVL shown in FIG. 5 and for explaining an operation during a high lift control by means of the exhaust VVL shown in FIG. 5, respectively.

Exhaust VVL 3 for right bank RB is described in, for example, a Japanese Patent Application Publication (tokkai) No. Heisei 10-008935 published on Jan. 13, 1998. That is to say, exhaust VVL 3, as shown in FIGS. 5, 6A, and 6B, includes: a high-speed cam 31 disposed, for each of the cylinders, on exhaust cam shaft 30 and used for the maximum lift; cylindrical cams 32, 32, for a zero-lift purpose, installed on both sides of high-speed cam 31; an integrated main rocker arm 34 disposed on positions corresponding to respective cylindrical cams 32, 32 and contacted on stem ends of both exhaust valves 5, 5; a sub rocker arm 35 which enables a lost motion and installed on a position corresponding to high-speed cam 31; a lost motion mechanism 36 installed on a lower portion of sub rocker arm 35; a lever member 38 swingably supported on a supporting shaft 37 fixed on main rocker arm 34 and which engages or disengages a lower end portion of sub rocker arm 35 to synchronously interlock sub rocker arm 35 and main rocker arm 34 or to release the interlock; and a hydraulic plunger 39 and a return spring 40 which engage or disengage lever member 38.

Hydraulic plunger 39 is retracted in response to a hydraulic supply from an oil pump 46 to an oil chamber 41 formed on an outer peripheral side thereof via hydraulic passages 41a, 41b formed within rocker shaft 3 or within sub rocker arm 34 and is advanced by means of a spring force of a coil spring 42 elastically disposed in an inner part thereof. In addition, an electromagnetically operated switching control valve 43 switches a conduction between hydraulic passages 41a, 41b and a drain passage 44 or drained hydraulic of oil pump 46. In addition, switching control valve 43 is switchingly operated in response to the control current outputted from control unit 22.

Hereinafter, an operation of exhaust valve VVL 3 will chiefly be described below. In a case where the engine driving condition is in the light load state (non-load state) during such as the idling drive (state) after the engine has started, control unit 22 detects this light load state and interrupts the current supply to switching control valve 43. Since hydraulic passages 41a, 41b are conducted to drain passage 44, the hydraulic pressure thereat is reduced. It should be noted that although a final destination of drain passage 44 is omitted in FIG. 5 but it is well known that the final destination of drain passage 44 is a reservoir tank in the hydraulic circuit.

Figure 6B:
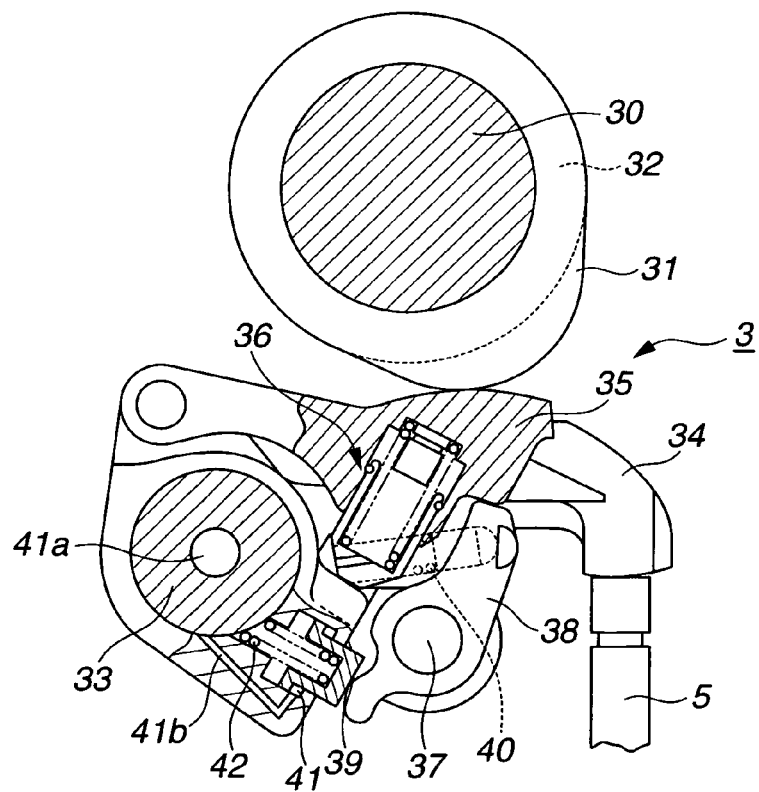

Hence, as shown in FIG. 6B, hydraulic plunger 39 is advanced by means of a spring force of coil spring 42 in order for lever member 38 to be pivoted against the spring force of return spring 40 in the counterclockwise direction. Then, a tip portion of lever member 38 is engaged with a lower end alligator portion of a tip portion of sub rocker arm 35 to cause sub rocker arm 35 and main rocker arm 34 to be interlocked.

Figure 8:
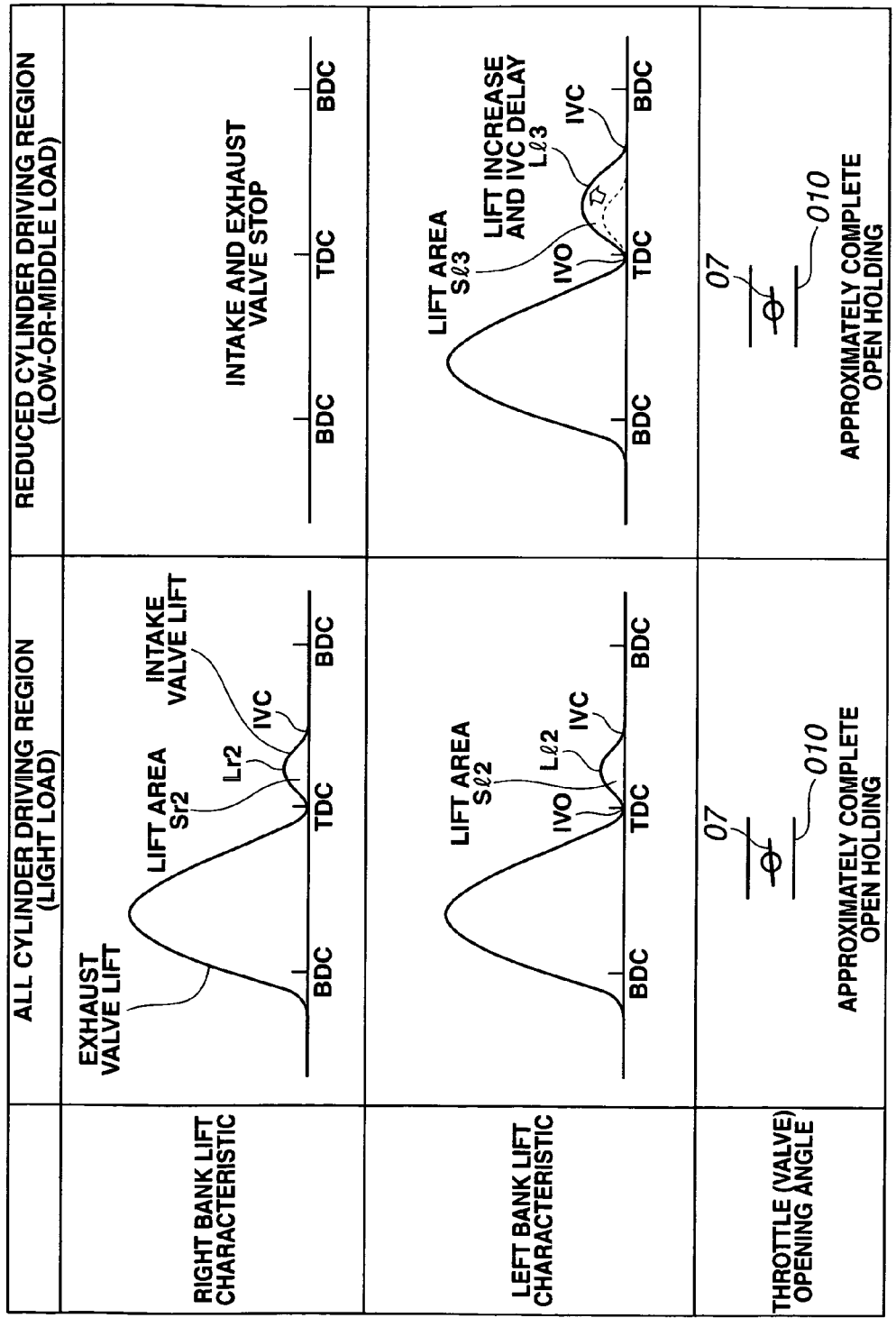
FIG. 8 is integrally a valve lift characteristic graph of intake and exhaust valves at right and left banks of cylinder groups during an all cylinder (working) driving region at a time of a light load region and during a reduced (working) cylinder driving region at a time of a low-or-middle load region, in the control apparatus for the internal combustion engine of the first embodiment shown in FIG. 1.

Thus, main rocker arm 34 is swung in accordance with a cam profile of high-speed cam 31 so that each of exhaust valves 5, 5 is controlled at the maximum lift (refer to the left-upper side of FIG. 8).

On the other hand, if the engine driving condition is transferred to the low-or-middle load region of the engine, switching control valve 43 is operated so that the drained hydraulic of oil pump 46 is supplied within oil chamber 41 (via hydraulic passages 41a, 41b) so that hydraulic plunger 39 is, as shown in FIG. 6A, retracted against the spring force of coil spring 42. Thus, lever member 38 is pivoted in the reverse direction according to the spring force of return spring 40 to cause the interlock between sub rocker arm 35 and main rocker arm 34 to be released. Thus, sub rocker arm 35 is in the lost motion state. Thereby, main rocker arm 34 is only slid and contacted onto cylindrical cams 30, 30 without receiving a lift force of high-speed cam 31. The lift (quantity) of each of exhaust valves 5, 5 is in the zero lift and is in the valve stopped state and corresponding intake valves 4. 4 are in the valve stopped state. Hence, the partial cylinder halt state occurs (refer to the right-upper side of FIG. 8).

On the other hand, if the engine driving condition is transferred from the low-or-middle load region to the high-load-and-high-revolution region, the power supply from control unit 22 to switching control valve 43 is interrupted. Hydraulic passages 41a, 41b are communicated with drain passage 44 so that the hydraulic of oil chamber 41 is reduced and, thus, hydraulic plunger 39 is advanced by means of a spring force of coil spring 42, as shown in FIG. 6B. Thus, lever member 38 is pivoted against the spring force of return spring 40 to engage the tip portion of lever member 38, during the base circle of the high-speed cam 31, with the lower end alligator portion of the tip portion of sub rocker arm 35 to cause the interlocking of sub rocker arm 35 and main rocker arm 34.

Hence, main rocker arm 34 is swung in accordance with the cam profile of high-speed cam 31 in the same way as the idling drive (the light load driving region) so that respective exhaust valves 5, 5 are switched to provide the maximum lift. In this way, this exhaust valve VVL 3 switches in an on-and-off manner the lift of exhaust valves 5, 5 to the zero lift and the predetermined high lift.

Figure 7:
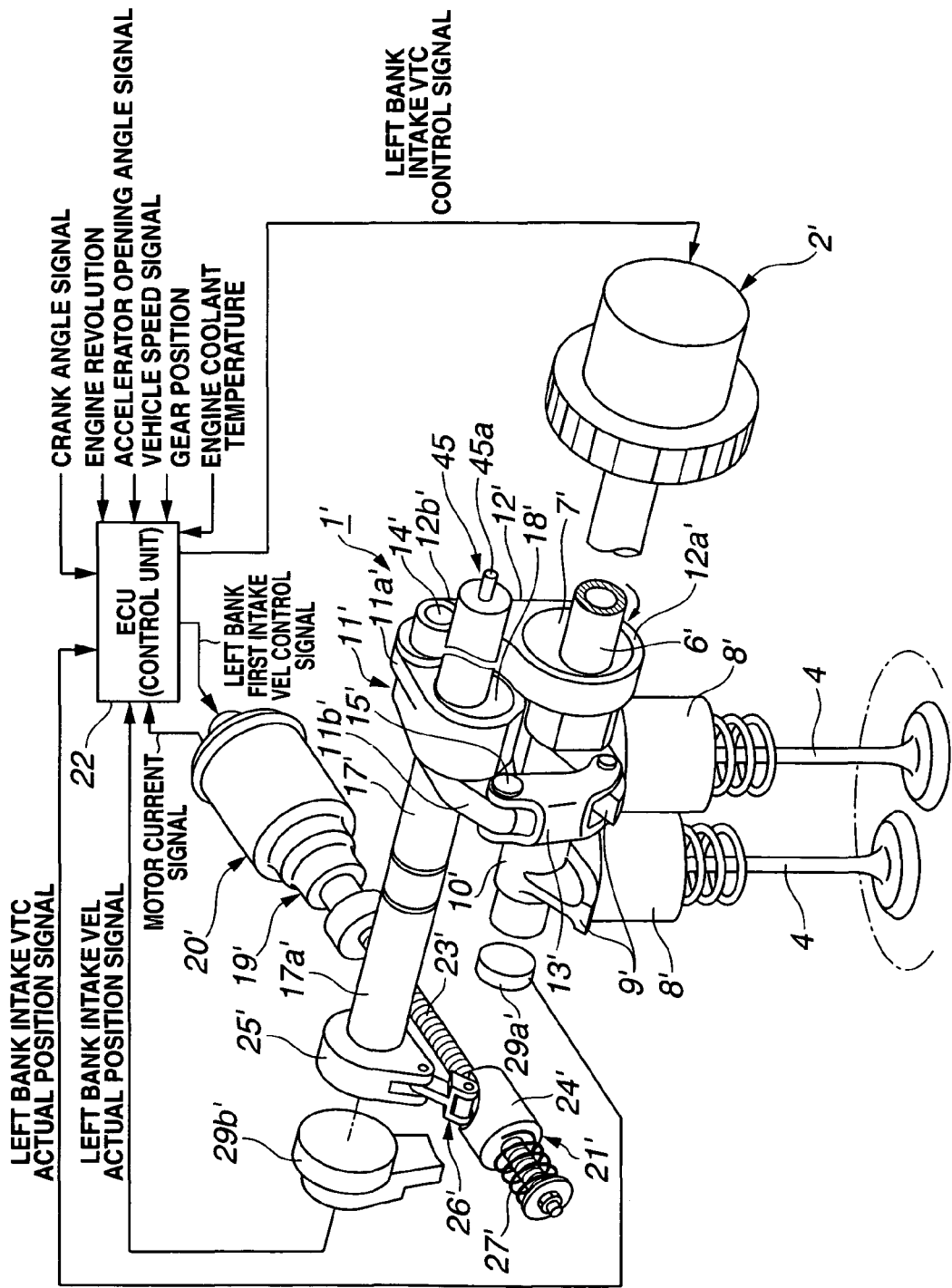
FIG. 7 is a perspective view for explaining a second intake VEL and a second intake VTC used in the first embodiment shown in FIG. 1.

Second intake VEL 1' at left bank LB, as shown in FIG. 7, has basically the same structure as first intake VEL 1 at right bank RB. Thus, the same reference numerals with superscript of ' designate like elements and the detailed explanations thereof will herein be omitted. Difference points between these mechanisms will chiefly be described below. That is to say, the second coil spring for ball nut 24' to be biased against control shaft 17' toward the larger lift control side is eliminated and only first coil spring 27' to be biased toward the small lift control side is provided. Furthermore, a stopper mechanism 45 to revolutionarily limit control shaft 17' to the predetermined small lift which does not provide zero lift at a small lift side biased by means of first coil spring 27' is provided. This stopper mechanism 45 includes: a stopper shaft 45a disposed on an one end surface of control shaft 17'; and a stopper wall (not shown) installed on a rocker cover or sop forth and on which stopper shaft 45a is appropriately contacted to limit the revolution of control shaft 17.

Hence, this second intake VEL 1' obtains the same action and advantage as first intake VEL 1 except that second intake VEL 1' cannot perform the zero lift control. During the engine stop, stopper mechanism 45 causes intake valves 4, 4 to be limited to the predetermined small lift described above via control shaft 17'. Thus, it becomes possible to secure the engine startability with the effect of the fail-safe function. That is to say, the intake air quantity required for the engine start is secured and a low-friction effect due to the small lift can be achieved.

Second intake VTC 2' has the same structure as first intake VTC 2. Thus, the specific explanation as described above can herein be omitted. In addition, its action is such that the valve closure and the valve open timings are controlled toward the advance angle side or the retardation angle side.

Hereinafter, a specific action of the first embodiment will be described below.

Figure 9:
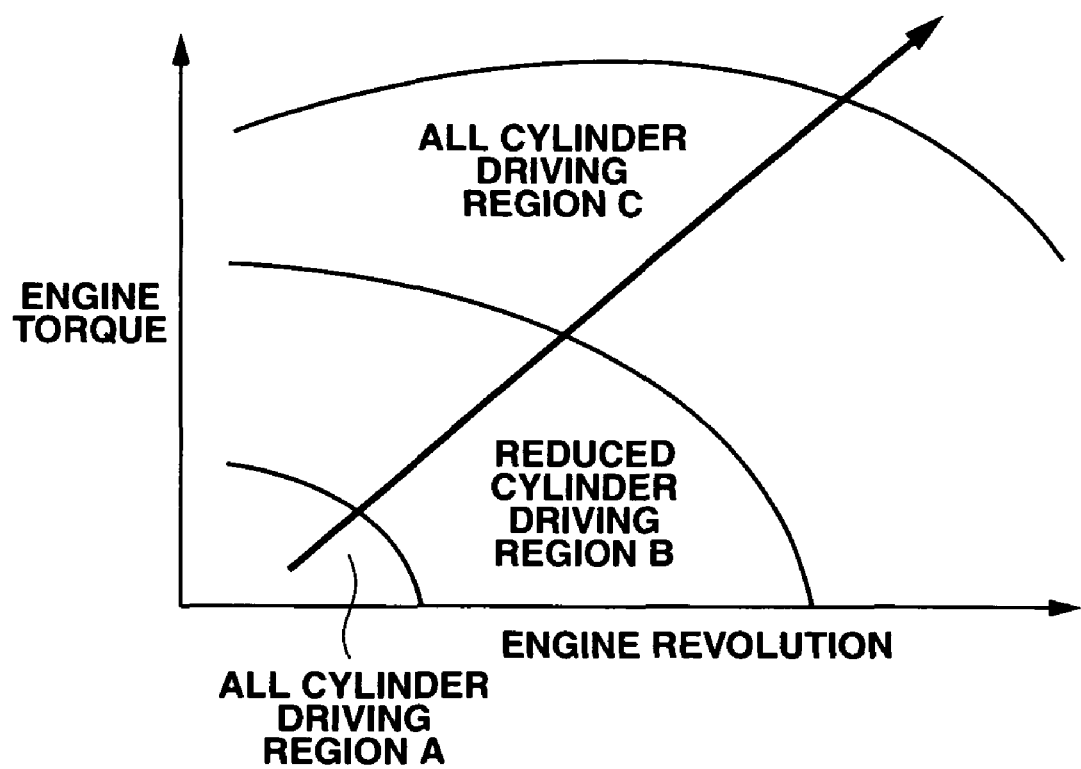
FIG. 9 is a control map representing a relationship between an engine revolution (number) and an engine torque by means of a control unit used in the first embodiment shown in FIG. 1.

As shown in FIG. 9, in the light-load-and-(low-revolution) driving region A in which the idling drive is included, all of intake valves and exhaust valves 4, 4, 5, 5 are worked in respective cylinder groups of left and right banks LB and RB (all-cylinder driving region A). It should be noted that the term of "working" means a state in which the output torque due to a fuel combustion through the fuel injection is developed.

In addition, in low-or-middle load region B, the cylinder group corresponding to right bank RB is valve stopped (the partial cylinder halt) and only the cylinder group of left bank LB is worked. It should be noted that the predetermined light load driving region corresponds to the all cylinder driving region A and the predetermined low-load-or-middle load driving region corresponds to the reduced cylinder driving region B.

Figure 10A:
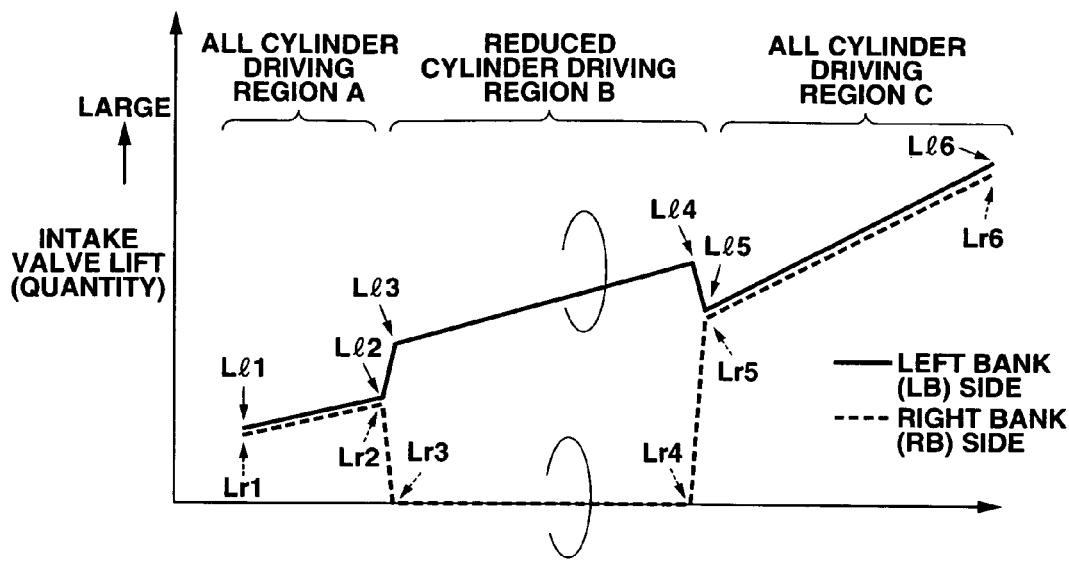
FIGS. 10A, 10B, and 10C are an intake valve lift characteristic graph in the first embodiment during all cylinder (working) driving region and during the partial cylinder halt (the reduced cylinder) driving region, an explanatory view for explaining a throttle valve opening angle during each of the driving regions, and an explanatory view for explaining the valve closure timing (IVC) of each intake valve during each of the driving regions, respectively.
Figure 10B:
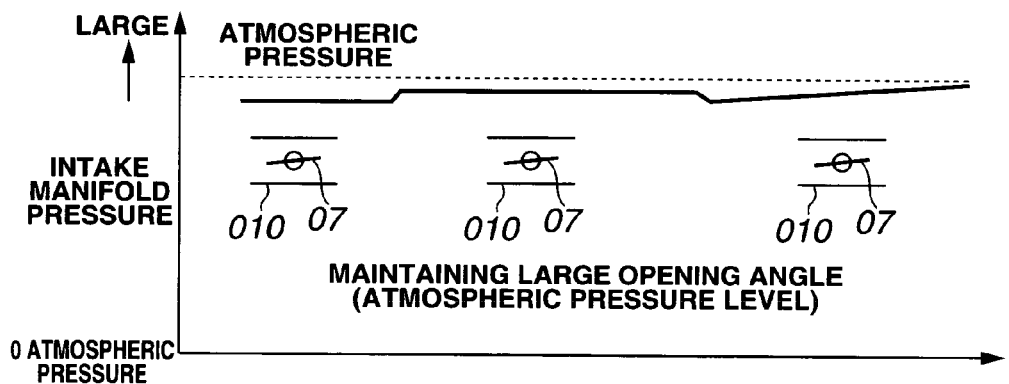
Figure 10C:
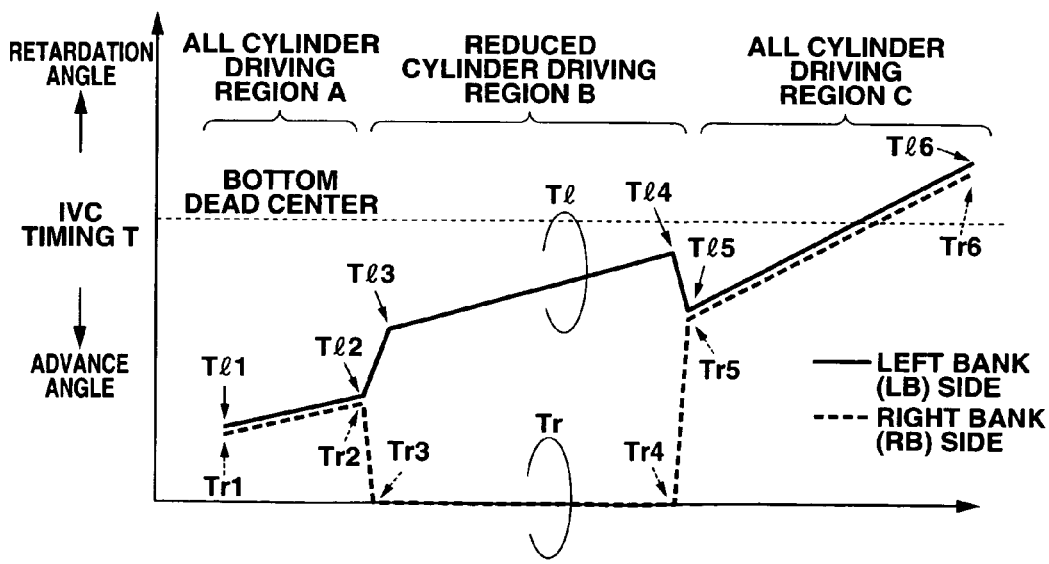

In a high-load-and(or)-high-revolution region C, the control is again transferred to all cylinder driving region to provide the engine torque. As shown in an arrow mark of FIG. 9, the variation in the lift (quantity) (L), the variation in the intake manifold pressure, and the variation in the IVC (Intake Valve Closure) timing T in a case where the engine revolution and the engine load are gently raised (swept) are shown in FIGS. 10A, 10B, and 10C. In other words, FIG. 10A shows a valve lift (quantity) Lr of intake valves 4, 4 of right bank RB denoted in a broken line and shows valve lift (quantity) L1 of intake valves 4, 4 of left bank LB denoted in the solid line according to the sweep of FIG. 9. FIG. 10B shows an internal pressure of intake manifold 09 located at the downstream side of throttle valve 07. During the sweeping, as shown in FIG. 9, the opening angle of throttle valve 07 is maintained approximately at a large opening angle so that the pressure within manifold 09 indicates near the atmospheric pressure. Hence, the engine torque is not only caused by the throttling of throttle valve 07 but is mainly controlled to the valve lifts (lift quantities) of intake valves 4, 4. FIG. 10C shows the variation of intake valve closure timing (IVC) in a case where the sweep as shown by the arrow mark in FIG. 9 is carried out. It should be noted that the fact that the IVC timing T of right bank RB is fixed onto the lowest position, as denoted by the broken line of FIG. 10C, indicates that intake valves 4, 4 are neither open nor closed due to their zero lifts.

Herein, a boundary between all cylinder driving region A and reduced cylinder driving region B and a proximity to the boundary will be described. As appreciated from FIG. 10A, at region A side immediately before the boundary transferred from all cylinder driving region A to reduced cylinder driving region B. As appreciated from FIG. 10A, at region A immediately before the boundary, the cylinder group of right bank RB indicate lift Lr2 and that of left bank LB indicate lift Ll2. Both lift values Lr2 and Ll2 indicate approximately mutually the same values. Thus, deviations of intake air quantities between both banks RB, LB can be reduced. The deviations of frictions in the corresponding valve variably operated systems can be reduced. The combustion variations for the respective cylinders including both banks can be suppressed and the revolutions of the engine can be stabilized.

In addition, as appreciated from FIG. 10C, for the valve closure timing (IVC) of the intake valves, Tr2 of right bank RB and Tl2 of left bank LB indicate approximately the same values. Thus, the deviations of the intake air quantities for the respective cylinders can be reduced and the engine revolutions can be stabilized.

In this addition, the intake air quantity control is carried out in such a way that the valve lift (quantity) is made small and the closure timing of the intake valves (IVC) is advanced with respect to a bottom dead center (BDC). Hence, as described before, throttle valve 07 can be largely (widely) opened. Consequently, the inner pressure of intake manifold 09 can be increased to become nearer to the atmospheric pressure. Consequently, the pumping loss can be reduced and the fuel consumption can be reduced even at all cylinder driving region A in which reduced cylinder driving is not carried out.

Next, reduced cylinder driving region B immediately after the boundary, viz., after the driving region is transferred to reduced cylinder driving region B will be described below. Lift Lr3 of intake valves 4, 4 of the cylinder group of right bank RB indicates 0 (valve stop) and valve lift of exhaust valves 5, 5 of that of the same bank also indicates 0 (valve stop). Thus, the cylinders of right bank RB are in the cylinder halt state. On the contrary, valve lift (quantity) Ll3 of intake valves 4, 4 of the cylinders of left bank LB indicates the increased state.

Middle left and right stages of FIG. 8 show a comparison between the left bank lift characteristics in all cylinder driving region A and in reduced cylinder driving region B. Ll2 and Ll3 denote the valve lift (quantities) in all cylinder driving region A and reduced cylinder driving region B. As appreciated from the middle stages of FIG. 8, lift Ll3 is larger than lift Ll2. Tl3 of intake valve closure timing (IVC) in reduced cylinder driving region B is more retarded toward the bottom dead center (BDC) than Tl2 of IVC in all cylinder driving region A. Hence, even if the driving region is transferred from all cylinder driving region A to reduced cylinder driving region B and the number of working cylinders of the engine is reduced by half, the lift (quantity) of intake valves 4, 4 of each of the working cylinders is increased and the IVC is made approached to the bottom dead center (BDC) to increase the intake air quantity of each of the working cylinders. A total of intake air quantities of all cylinders can have the same level as that when all cylinders are worked. Hence, a torque variation when the driving region is transferred from all cylinder driving region A to reduced cylinder driving region B can be suppressed.

In addition, as shown in a lowest stage of FIG. 8, the switching of the driving region is carried out while the large opening angle of throttle valve 07 is maintained. Hence, the inner pressure of intake manifold 09 maintains a proximity to the atmospheric pressure. That is to say, a transient torque variation which is developed due to a large change in intake manifold 09 maintains a proximity to the atmospheric pressure. That is to say, a transient torque variation which is developed due to a large change in the intake manifold internal pressure at the time of a transient state of switching of the driving region. Hence, a torque shock during the switching can effectively be suppressed.

As shown in middle stages of FIG. 8, an intake valve open timing (IVO) at the left-side bank LB in the case of lift (quantity) Ll2 is approximately coincident with that in the case of lift (quantity) Ll3.

Hence, a variation of a valve-overlap before and after the switching between the driving regions A and B is carried out can be suppressed. A variation in a residual gas quantity taken into combustion chamber 06 during a time duration for which the valve overlap variation occurs can be suppressed. Hence, the torque difference before and after the switching is carried out can be made small.

It should be noted that, in a case where valve lifts (lift quantities) (Ll2, Ll3) of intake valves 4, 4 of left bank LB shown in the middle stages of FIG. 8 are sufficiently small under respective engine driving regions A and B, a flow speed of fresh air sucked from gaps of intake valves 4, 4 into combustion chamber 06 becomes faster to a sound speed level. At this time, a, so-called, choking phenomenon is developed. Then, the intake air quantity within combustion chamber 06 is roughly to be determined according to a time area S (Sl2, Sl3) of the corresponding lift (quantity) Ll (Ll2, Ll3).

It should be noted that, if time area of Sl3 is about twice as wide as Sl2 (Sl3≈2Sl2), the development in the torque difference can be prevented even though the choking is developed. In other words, if the driving region is transferred from all cylinder driving region A to reduced cylinder driving region B and the number of working cylinders are reduced by half, the time area S of the lift of the working cylinders is increased twice (two times). In this case, the time area of the total lift (quantity) as viewed from the whole cylinder is substantially equal to each other. That is to say, Sl3=Sl2×all cylinder numbers (the whole number of cylinders)/working cylinder numbers (the number of working cylinders). It should herein be noted that Lr2 and Ll2 during the all cylinder driving region A are mutually the same and Sr2 and Sl2 are approximately the same.

While the engine driving condition is in the reduced cylinder driving region B, the number of working cylinders are reduced. Hence, a surface area within each of the cylinders is accordingly reduced, a cooling loss is accordingly reduced, and the fuel economy is accordingly improved. In addition to this effect, the fuel economy can furthermore be improved according to an effect of a reduction in the pumping loss. In addition to the fact that IVC is before the bottom dead center (BDC), an effective compression ratio is reduced and a compression top dead center (TDC) temperature is reduced. Hence, the cooling loss is furthermore reduced. Thus, the fuel consumption can sufficiently be saved.

Next, if the driving condition is furthermore swept in reduced cylinder driving region B to raise the engine load and/or the engine revolution, the driving condition is (again) transferred to another all cylinder driving region C (as shown in FIG. 9). Other all cylinder driving region C corresponds to the high-load-and-high-revolution driving region.

That is to say, although the cylinders of right bank RB have been in the cylinder halt state, in other words, the lift (quantity) (Lr4) of intake valves 4, 4 of each of the cylinders of right bank RB indicates 0 (Lr4) and the lift (quantity) of exhaust valves 5, 5 of right bank RB has also indicated 0 in the engine driving region of reduced cylinder driving region B, the lift (quantity) thereof (Lr4) is switched to a middle lift (quantity) (Lr5) and the lift (quantity) of exhaust valves 5, 5 is switched to the ordinary lift (the maximum lift) immediately after the engine driving condition is transferred to other all cylinder driving region C. The ordinary lift (quantity) is the same as the stationarily (fixedly) operated lift (quantity) of exhaust valves 5, 5 of the all time working cylinder group of left bank LB.

On the other hand, the lift (quantity) of intake valves 4, 4 of left bank LB is reduced from slightly large lift (quantity) state Ll4 to lift (quantity) Ll5 as shown in FIG. 10A.

Hence, the total intake air quantity for all cylinders is suppressed to the same level and the development of the torque difference can be suppressed.

In addition, lift (quantity) Ll5 of left bank LB in other all cylinder driving region C and lift quantity Lr5 of right bank RB are mutually the same lift values. As shown in FIG. 10C, timing values Tl5, Tr5 of intake valve closure timing (IVC) of respective intake valves 4, 4 of left and right banks LB, RB. As shown in FIG. 10C, timing values Tl5, Tr5 of intake valve closure timing (IVC) of respective intake valves 4, 4 of left bank and right bank LB, RB indicate approximately the same timing values in other all cylinder driving region C. Hence, a development of an intake swirl can be suppressed and a high torque can be obtained.

Next, if the engine load and revolution are furthermore increased in other all cylinder driving region C (as shown in FIG. 9), the lifts (lift quantities) are increased while valve lifts (lift quantities) are increased while valve lifts (lift quantities) of intake valves 4, 4 of left and right banks LB and RB maintain approximately the same lift values (lift quantities) and Tl, Tr of both banks LB, RB (intake valve closure timings (IVC) of both banks LB, RB) are retarded while timing values of Tl and Tr (intake valve closure timings (IVC) of both banks LB, RB) maintain mutually the same values. Consequently, a desired high rise of the engine torque can be obtained.

It should be noted that throttle valve 07 is maintained in the large opening angle state (the atmospheric pressure level of the internal pressure within the intake manifold 09), the pumping loss can be reduced and the improvements in the fuel economy (saving of the fuel consumption) and in the engine torque can be achieved.

In addition, since throttle valve 07 is maintained in the large opening angle state when the engine driving condition is switched from all cylinder driving region A to reduced cylinder driving region B and when the engine driving condition is switched from reduced cylinder driving region B to other all cylinder driving region C, the transient torque shock due to a transient variation of the internal cylinder within intake manifold 09, in spite of the large switching variation of valve lift characteristics, can be prevented.

Second Embodiment

Figure 11:
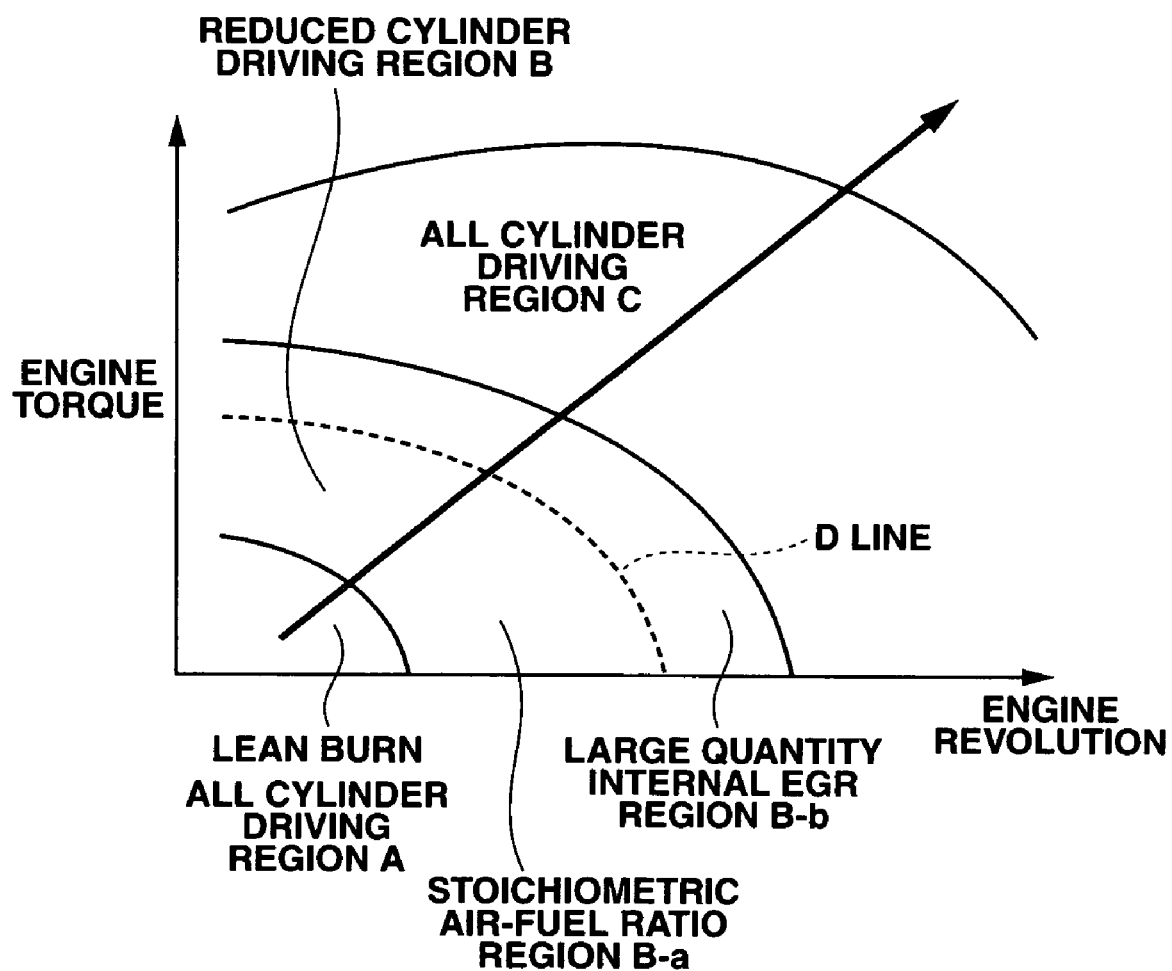
FIG. 11 is a control map representing a relationship between an engine revolution and the engine torque in the control unit used in a second preferred embodiment of the control apparatus for the internal combustion engine according to the present invention.
Figure 12A:
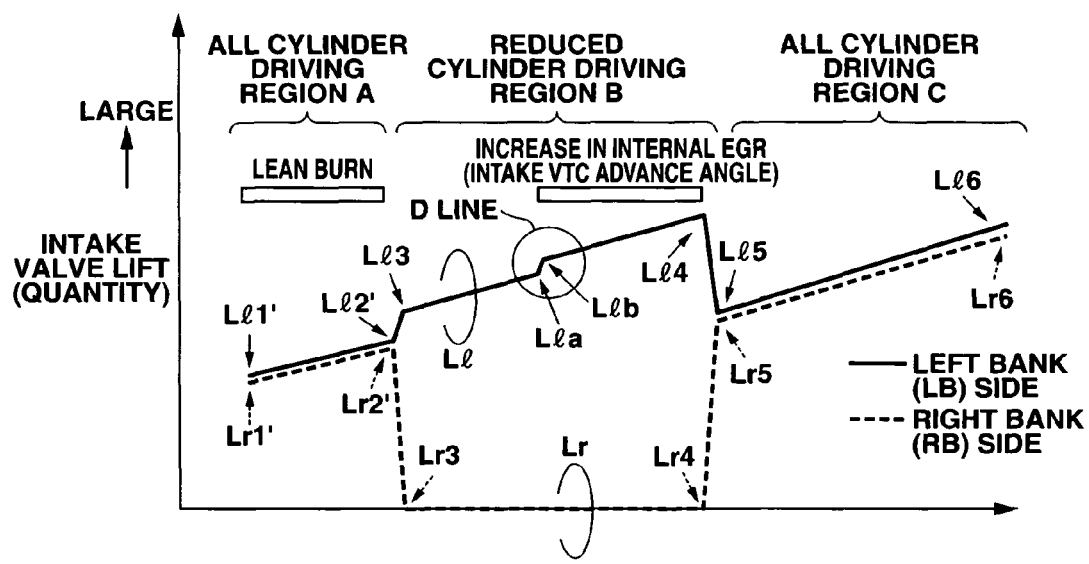
FIGS. 12A and 12B are an intake valve lift characteristic graph in the second embodiment during the all cylinder (working) driving region and during the partial cylinder halt (the reduced cylinder) driving region and an explanatory view for explaining a throttle valve opening angle during each of the driving regions in the second embodiment, respectively.
Figure 12B:
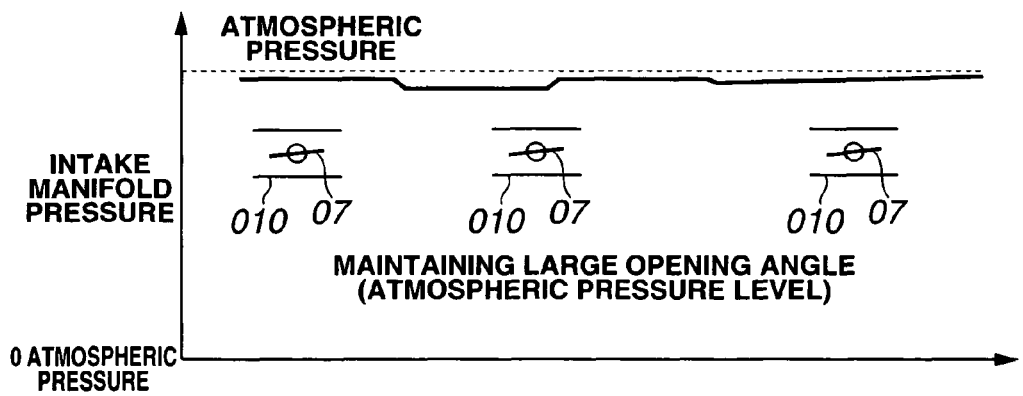
Figure 13:
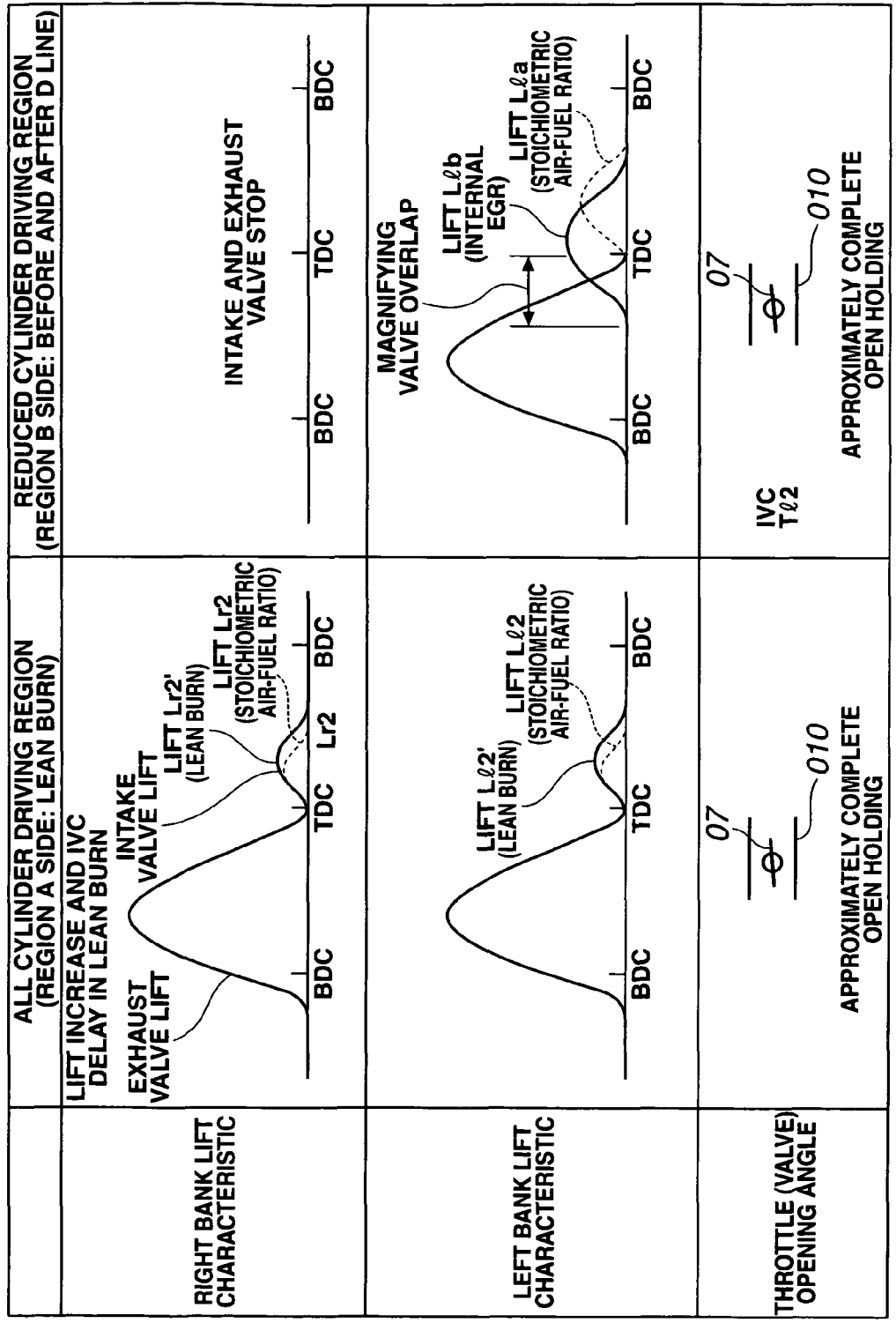
FIG. 13 is integrally a valve lift characteristic graph of intake and exhaust valves at right and left banks of cylinder groups during an all cylinder (working) driving at a time of the light load region and during the reduced (working) cylinder driving at a time of the low-or-middle load region, in the control apparatus for the internal combustion engine of the second embodiment according to the present invention.

FIGS. 11 through 13 show control characteristics by the control apparatus in a second preferred embodiment according to the present invention. As shown by a control map of FIG. 11, in all cylinder driving region A during the light load driving including an idling (state) driving, a lean burn control such that air mixture fuel whose fuel is injected from each of fuel injection valves 08 of left and right banks LB, RB to corresponding combustion chamber 06 is more dilute than a stoichiometric air-fuel ratio is carried out. According to the lean burn control, the engine torque with respect to the same intake air volume is reduced. To obtain a target torque, the lift (quantity) is needed to be made large.

Herein, the boundary of mutually adjacent driving regions and the proximity to the boundary when the swept engine driving condition is transferred from all cylinder driving region A to reduced cylinder driving region B will be described below. When the driving region is transferred from all cylinder driving region A to reduced cylinder driving region B, to execute the lean burn control, lifts (lift quantities) Lr2', Ll2' of intake valves 4, 4 of each of cylinders of right and left banks RB, LB are slightly larger than lifts (lift quantities) Lr2, Ll2 thereof in the case of the first embodiment, as shown in FIGS. 12A and 12B. Hence, the unstabilization of the engine revolution due to the deviations of the lifts between the respective cylinders which provide a problem when the lifts are made to the small lifts under the light load driving can be avoided. This is because each control lift (quantity) (the lift (quantity) to be controlled) is made larger than the ordinary (the lift quantity in the case of the first embodiment) and a base lift (a fundamental lift (quantity) from which the deviations are excluded) becomes high (large) even through the same lift deviations are provided, a ratio of the lift deviations is reduced. It should be noted that, when the lean burn control is executed for the engine, NOx (nitrogen oxide) becomes easy to be developed but an actual damage is not received due to the light load driving region.

On the other hand, in reduced cylinder driving region B shown in FIG. 11, the air-fuel mixture whose fuel is injected fuel is maintained at the stoichiometric air-fuel ratio. In this case, lift Ll3 of intake valves 4, 4 of left bank LB is not increased as compared with the ordinary lift (the lift (quantity) in the case of the first embodiment). Hence, a response speed of switching from lifts Ll2' to Ll3 becomes faster. Thus, a control accuracy can be improved.

In a higher load side division (B-b) exceeding a D line shown in FIG. 11 when the engine driving condition is in reduced cylinder driving region B, second intake VTC' for left bank LB controls the intake valve open-and-closure timing phase of intake valves 4, 4 toward an advance angle side. Thus, the valve overlap to exhaust valves 5, 5 is created and an internal EGR (Exhaust Gas Recirculation) is increased (refer to FIG. 13). This causes a rate of specific heat of air-fuel mixture to be increased to enable an improvement in the fuel economy.

In addition, in reduced cylinder driving region B, an internal cylinder pressure (in-cylinder pressure) (load) of the working cylinders of left bank LB is raised. Hence, in principle, NOx is easy to be developed. However, in this embodiment, internal EGR according to the valve overlap is used in place of an external EGR through an EGR valve, Hence, even though the EGR is carried out for a large quantity of exhaust gas, a problem of clogging of an EGR passage such as in a case of external EGR is eliminated. This large quantity of internal EGR can reduce NOx.

Furthermore, since, in the case of the external EGR, exhaust gas is circulated according to a negative pressure within intake manifold 09 of the engine, it may be difficult to make the large quantity of exhaust gas EGR (recirculate the exhaust gas) under the reduced cylinder driving region in which the internal pressure of intake manifold 09 indicates a pressure near to the atmospheric pressure. However, when a magnification control of the valve overlap according to the advance angle control by means of second intake valve 2' is carried out in this embodiment, internal EGR can be carried out even under such a high internal pressure of intake manifold 09 as described above. Hence, since the large quantity of EGR is possible, the increase in NOx which provides the problem during reduced cylinder driving region B can be avoided.

It should be noted that, for D line described above with reference to FIG. 11 and to FIGS. 12A and 12B, lift (quantity) Lla (refer to FIG. 12A) of intake valves 4, 4 of left bank LB in a lower load side division (B-a) of reduced cylinder driving region B that does not exceed D line indicates a state in which the stoichiometric air-fuel ratio is carried out and lift (quantity) Llb (refer to FIG. 12A) of intake valves 4, 4 of left bank LB in a higher load side division (B-b) of reduced cylinder region B that exceeds D line indicates a state in which internal EGR is increased (the advance control by means of second intake VTC 2'). The reason that, in the above described lifts (lift quantities), a relationship of Lla<Llb is to correct the torque reduction due to the increase of internal EGR and a working angle (valve open interval of time) is magnified to make the intake valve open timing (IVO) earlier.

It should also be noted that, in the lower load side division (B-a) of reduced cylinder driving region B, the lean burn control may be executed in place of the stoichiometric air-fuel ratio (control). In this alternative case, the fuel economy can furthermore be improved. However, it is possible for NOx to be reduced to a predetermined low level due to the light (small) engine load.

In addition, throttle valve 07 is almost in a complete open state in each of driving regions A, B, and C as shown in lowest stages of FIG. 13. Thus, the internal pressure of intake manifold 09 becomes near to the atmospheric pressure. Thus, the same actions and advantages as described in the first embodiment can be achieved such as the achievement of the reduction of pumping loss.

Third Embodiment

Figure 14:
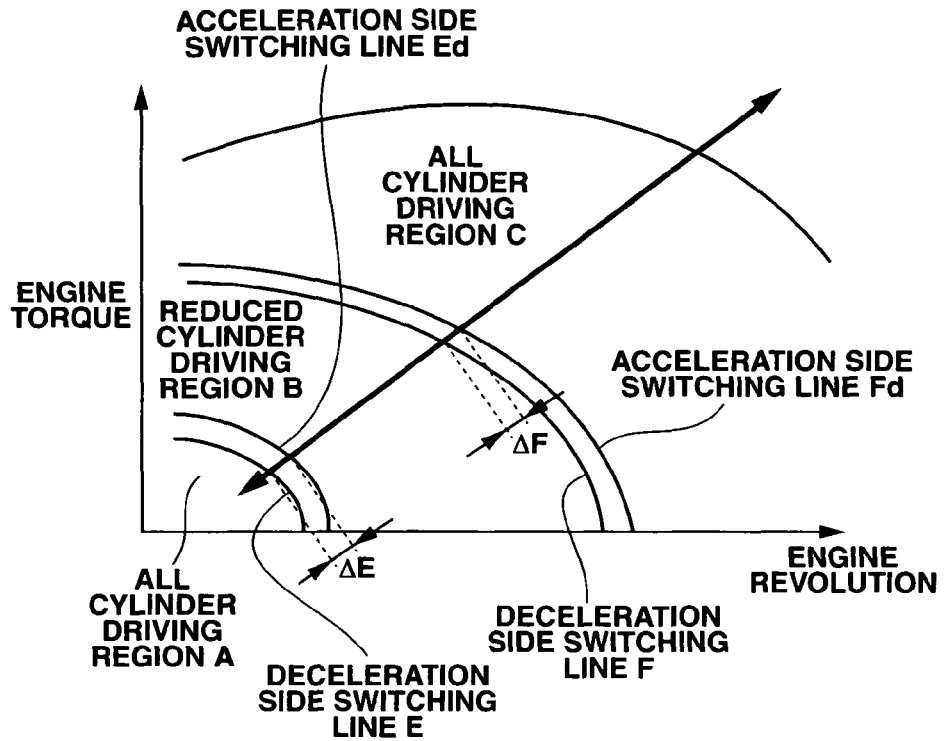
FIG. 14 is a control map representing a relationship between the engine revolution (number) and the engine torque in the control unit used in a third preferred embodiment of the control apparatus for the internal combustion engine according to the present invention.
Figure 15:
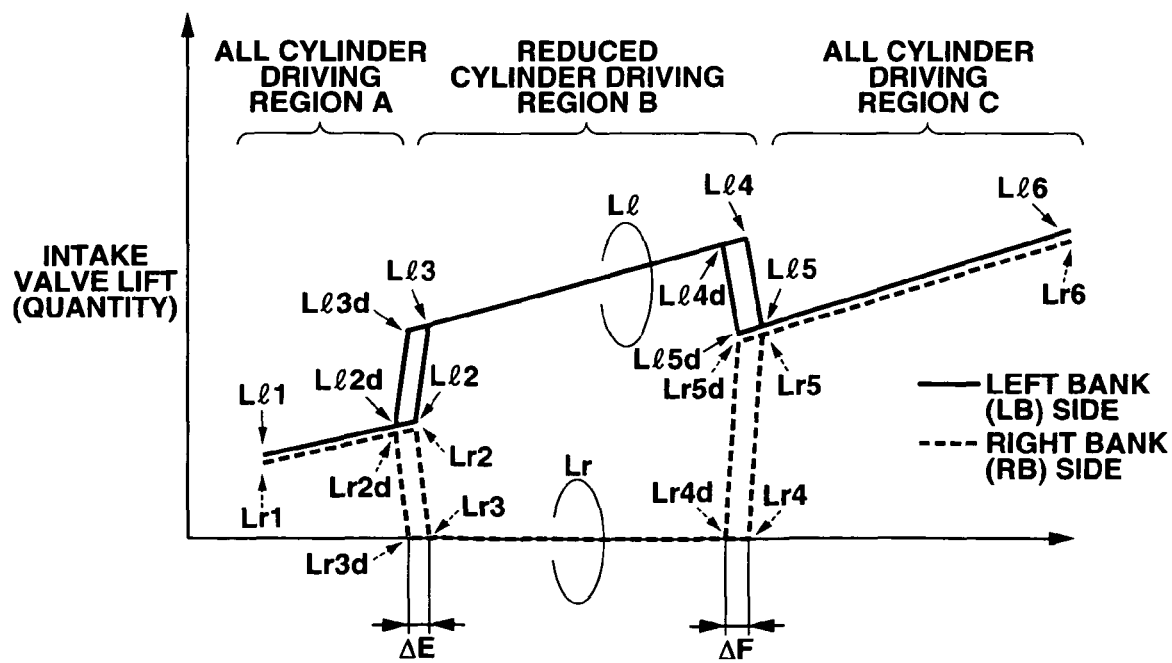
FIG. 15 is intake valve lift (quantity) characteristic graphs representing the intake valve lifts (lift quantities) at the left and right banks during the all cylinder (working) driving region and during the reduced cylinder driving region in the third embodiment of the control apparatus for the internal combustion engine according to the present invention.

FIGS. 14 and 15 show control characteristics by the control apparatus in a third preferred embodiment according to the present invention. In this embodiment, as shown in a control map of FIG. 14, first and second hysterisises of mutually the same characteristics are provided for a switching boundary line between the valve stop and the valve lift operation in intake valves 4, 4 of right bank RB and for a switching boundary line of a lift abrupt change line of intake valves 4, 4 of both of left bank LB and right bank RB.

That is to say, a switching line E in an engine-load-and-engine-revolution decreasing direction between all cylinder driving region A and reduced cylinder driving region B with respect to another switching line Ed in an engine-load-and-engine-revolution increasing direction is slightly set in the engine-load-and-engine-revolution decreasing direction, as shown in FIG. 14. In other words, first hysterisis of a width of ΔE is provided as shown in FIGS. 14 and 15. Thus, a development of hunting which occurs during switching operations in first and second intake VEL 1, VEL 1' of both banks of left and right banks LB, RB, first and second intake VTC 2 and VTC 2' thereof, and first exhaust VVL 3 thereof can be prevented.

In FIG. 15, for the boundary between all cylinder driving region A and reduced cylinder driving region B, the hysterisis between lift (quantity) Lr3 and lift (quantity) Lr3*d* of intake valves 4, 4 of the cylinders of right bank RB corresponds to ΔE. In the same way, each of first hysterisis of width ΔE between lifts (lift quantities) Lr2 and Lr2*d*, between lifts (lift quantities) Ll3 and Ll3*d* in the case of left bank LB, and between lifts (lift quantities) Ll2 and Ll2*d* in the case of left bank LB is provided.

In addition, for the boundary between reduced cylinder driving region B and other all cylinder driving region C, second hysterisis of width of ΔF is provided between lifts (lift quantities) Lr4 and Lr4*d*. In the same way, second hysterisis of width of ΔF is provided between lifts (lift quantities) Lr5 and Lr5*d*, and between lifts (lift quantities) Ll5 and Ll5*d*, and between lifts (lift quantities) Ll4 and Ll4*d*, as shown in FIG. 15.

Since ΔE is in an ordinarily used region, the width of ΔE is se to be slightly larger (wider) than that of ΔF. Thus, it becomes difficult to develop an unpleasant feeling in the ordinarily used region.

On the other hand, ΔF is located at higher revolution and higher load side than ΔE. A development frequency of the hunting is reduced at the region corresponding to ΔF. Thus, ΔF is set to be made smaller (narrower) than ΔE to improve the switching response characteristic.

In addition, in this embodiment, throttle valve 07 is approximately in a completely open state in each driving region. Thus, the reduction of pumping loss can be achieved and the fuel consumption can be saved. Consequently, the same actions and advantages as those in the first embodiment can be achieved.

The present invention is not limited to the structure of each embodiment described hereinabove. For example, as the internal combustion engine, the present invention can be applied to an in-line engine other than V-type engine and the present invention can be applied not only to the spark-ignited combustion engine but also applied to a compression ignition engine.

In place of (valve stop mechanism) exhaust VVL 3 for exhaust valves 5, 5, a continuously variable lift mechanism which is lift (quantity) variable to the zero lift in the same way as first intake VEL 1 may be used. Furthermore, a specific structure of first intake VEL 1 and second intake VEL 1' are particularly not limited to those described in each of the embodiments but may be a continuously variable lift mechanism of another mechanism described in, for example, a Japanese Patent Application Publication (tokkai) 2006-200391 published on Aug. 3, 2006.

Technical ideas of the present invention and effects thereof will hereinafter be described.

(A). A control apparatus for an internal combustion engine, comprises: a first cylinder group in which both of intake and exhaust valves of each of engine cylinders thereof are controllably stopped; a second cylinder group in which a lift of the intake valve of each of the engine cylinders thereof is variably controlled; and a controller configured to control the lift of the intake valve of each of the engine cylinders of the second cylinder group in order for an engine torque when the intake and exhaust valves of each of the cylinders of the first cylinder group are controlled to be stopped to be approximately equal to the engine torque by means of the first cylinder group and the second cylinder group before the intake and exhaust valves of each of the cylinders of the first cylinder group are controlled to be stopped.

In a case of the present invention as described in item (A), when the engine driving region is transferred to the reduced cylinder driving region (B), a development of a torque stepwise difference in not only dependent upon an opening angle of the engine throttle valve but mainly dependent upon the lift (quantity) (the opening angle quantity) of the intake valve(s) to perform a suppression control of the intake valve.

That is to say, suppose that the present invention is applied to, for example, V-type internal combustion engine. During the no-load or the light load driving region such as the idling drive of the engine, the all cylinder driving of both of the left and right banks (LB, RB) is carried out to suppress the unstabilization of the engine revolution. In this case, the opening angle of the engine throttle valve is in a large opening angle state and the lifts (lift quantities) of the respective intake valves of all cylinders are controlled to be small to control the intake quantity to be reduced.

On the other hand, suppose a case where the engine driving region is transferred to the predetermined low-load-or-middle-load driving region (reduced cylinder driving region B) which is a stead-state driving. In this case, for example, the operations of the intake and exhaust valves of each of the cylinders of the right bank are stopped in the closed states and only the intake and exhaust valves of each of the cylinders of the left bank are operated. In this case, the opening angle of the engine throttle valve is in the large opening angle state. The lift (quantity) of each of the intake valves of the left bank is controlled to be a relatively large middle lift (quantity) from the predetermined small lift to increase the intake air quantity.

Hence, in each engine driving region, the opening angle of the engine throttle valve is in a large opening angle region. Thus, the pumping loss can sufficiently be reduced. Consequently, the fuel economy can be achieved.

In addition, the intake air quantity per cylinder operated according to a difference in the lift (quantity) can relatively be reduced in the case of the all cylinder driving region and can relatively be made large in the case of the partial halt cylinder (reduced cylinder) driving region (B). Thus, the engine torque as a whole engine can be approached to each other between the all cylinder driving region and the reduced cylinder driving region. Furthermore, the opening angle of the engine throttle valve during the switching from the all cylinder driving to the partial halt cylinder driving region is maintained at the large opening angle. Thus, the variation in the internal pressure of the intake manifold of the engine is suppressed and a transient torque shock can be reduced.

(B). A control apparatus for an internal combustion engine, comprises: a first control mechanism configured to perform a valve stop control for intake and exhaust valves of each of engine cylinders of a first cylinder group; and a second control mechanism configured to perform a variable control for a lift of the intake valve of each of the engine cylinders of a second cylinder group, wherein, when the first control mechanism performs the valve stop control of the intake and exhaust valves of each of engine cylinders of the first cylinder group, the second control mechanism performs the lift of the intake valve of each of the engine cylinders of the second cylinder group to maintain an engine torque by means of the first and second cylinder groups before the valve stop control performed by the first control mechanism.

According to the present invention described in item (B), specific mechanisms of the first control mechanism and the second control mechanism control the lifts (lift quantities) of the intake and exhaust valves of the respective cylinder groups. Hence, the same effects as those described in the case of item (A) can be obtained.

(C). A control apparatus for an internal combustion engine, comprises: a first lift variable mechanism configured to approximately zero lifts of both of intake and exhaust valves of a first cylinder group to perform a valve stop control for the intake and exhaust valves of each of engine cylinders of the first cylinder group; and a second lift variable mechanism configured to perform a continuously variable control for the lift of the intake valves of each of the engine cylinders of an all time working second cylinder group and wherein the second lift variable mechanism performs the continuously variable control for the lift of the intake valve of each of the cylinders of the second cylinder group to be increased in order to maintain a variation of an engine torque before and after a zero lift control of the lifts of the intake and exhaust valves of each of the engine cylinders of the first cylinder group is performed by the first lift variable mechanism at a value equal to or smaller than a predetermined value, when the first lift variable mechanism zeroes the lifts of the intake and exhaust valves of each of the cylinders of the first cylinder group to perform the zero lift control.

According to the present invention described in item (C), the first lift variable mechanism and the second lift variable mechanism can achieve the same effects as those described in item (A).

(D). In the valve mechanism for the internal combustion engine as set forth in item (A), the controller performs a valve stop control in order for the lifts of the intake and exhaust valves of each of the cylinders of the first cylinder group to approximately be zeroed when an engine revolution is raised from a predetermined light load driving region or an engine load is raised therefrom.

When the valve stop control is performed by the controller, the throttle valve is maintained in the large opening angle state after and before the switching of control to the valve stop control. The pressure within the intake manifold is at the approximately same value as those after and before the throttle valve and near to the atmospheric pressure. Hence, as described above, the pumping loss is reduced and the fuel economy can be achieved in both of the all cylinder driving region and the reduced cylinder driving region. In this addition, in either of the cases where the engine revolution is raised or the engine load is raised, the pressure difference of the intake manifold before and after the switching of control is small. Thus, the step difference of the transient torque due to the transient variation of the pressure of the intake pipe can be made small and the transient torque can be reduced.

(E). According to the present invention, in the control apparatus of the internal combustion engine as set forth in item (A), the controller sets a number of the cylinders of the first cylinder group to be the same as that of the second cylinder group and the controller performs a valve stop control for the intake and exhaust valves of each of the cylinders of the first cylinder group to make each of the lifts of the intake and exhaust valves of each of the cylinders of the first cylinder group in an approximately zero state and controls a time area of the lift of the intake valve of each of the cylinders of the second cylinder group to be approximately equal to a sum of the time area of the lift of the intake valve of each of the cylinders of the first cylinder before the valve stop control and the time area of the lift of the intake valve of each of the engine cylinders of the second cylinder before the valve stop control.

According to the present invention described in item (E), for example, during the predetermined light load driving region such as the idling drive, the lift of the intake valve(s) is small so that a flow speed of intake air within the cylinders is in a region approximately near to a sound speed and the choking phenomenon is developed. Thus, the time area of the lift (quantity) is in a proportional relationship to the intake air quantity.

Hence, when the engine driving region is changed from the all cylinder driving region to the reduced cylinder driving region, the intake air quantity of the whole engine can approximately be made equal between those of the all cylinder driving region and of the reduced cylinder driving region. Consequently, the torque stepwise difference can be difficult to be developed.

(F). According to the present invention, in the control apparatus for the internal combustion engine as set forth in item (A), the controller controls a valve open timing of the intake valve of each of the cylinders of the second cylinder group after a valve stop control for the intake and exhaust valves of each of the cylinders of the first cylinder group to be made approximately coincident with that before the valve stop control while increasing the lift of the intake valve of each of the cylinders of the second cylinder group and, simultaneously, controls a valve closure timing of the intake valve of each of the cylinders of the second cylinder group to be directed toward a retardation angle side than that before the valve stop control.

According to the present invention described in item (F), after control is transferred to the valve stop control, the open timing of the intake valve(s) is made constant, namely, the time area of the lift can be increased, with the valve overlap made constant. An influence of residual gas variation is not easy to be received and the torque step difference is not easy to be developed.

(G). According to the present invention, in the control apparatus for the internal combustion engine as set forth in item (A), the controller switchingly controls an engine driving region to be an all cylinder driving region in which a valve stop control for the intake and exhaust valves of each of the cylinders of the first cylinder group to be approximately zeroed is not performed under a predetermined light load state of the engine.

According to the present invention, in the control apparatus for the internal combustion engine as set forth in item (G), at the predetermined light load driving region such as the idling drive of the engine, a worsening of the variation in the engine revolution due to the reduced cylinder driving can be avoided. Consequently, the engine stabilization during the predetermined light load can be achieved.

(H). According to the present invention, in the control apparatus for the internal combustion engine as set forth in item (G), the controller controls an air-fuel ratio of the engine toward a leaner side with respect to a stoichiometric air-fuel ratio under the predetermined light load state of the engine.

According to the present invention, in the control apparatus for the internal combustion engine as set forth in item (H), the lift (quantity) of the intake valve(s) can be enlarged under the predetermined light load driving region such as the idling drive. Thus, the deviations of the combustion due to the deviations of the lifts between the cylinders can be reduced. A thermal efficiency due to the improvement in the rate of the specific heat can be improved. Consequently, the fuel economy can be achieved. In addition, the increase in NOx due to the leaning of air mixture fuel can give actual damage due to the engine driving region of the predetermined light load state.

(I). According to the present invention, in the control apparatus for the internal combustion engine as set forth in item (C), the first lift variable mechanism is provided with a first control section configured to continuously vary the lift of the intake valve of each of the cylinders of the first cylinder group with a driving force given and to hold the lift of the intake valve thereof at a predetermined middle lift position mechanically not a zero lift in a case where no driving force is given.

According to the present invention, in the control apparatus for the internal combustion engine described in item (I), even if a failure in an electrical system occurs, the intake valves of the first cylinder group are mechanically held at the predetermined middle lift position not mechanically in the valve stop state (zero lift). Hence, a favorable re-startability of the engine can be secured and a mechanical fail-safe can be obtained.

(J). According to the present invention, in the control apparatus as set forth in item (C), the second lift variable mechanism comprises a second control section configured to variably control the lift of the intake valve of each of the cylinders of the second cylinder group with a driving force given and a stopper section configured to limit the lift of the intake valve of each of the cylinders of the second cylinder group at a position at which the lift of the intake valve of each of the cylinders of the second cylinder group provides a predetermined small lift in a case where no driving force is given.

According to the present invention, in the control apparatus for the internal combustion engine described in item (J), since the second lift variable mechanism mechanically holds the lifts of the intake valves in the second cylinder group (does not perform the zero lift control) at the predetermined small lifts. Favorable re-startablity after the engine stop including the effect of reducing the friction can be secured and the mechanical fail-safe can be obtained.

(K). According to the present invention, in the control apparatus for the internal combustion engine as set forth in item (A), the controller comprises a first lift variable mechanism configured to approximately zero lefts of both of the intake and exhaust valves of the first cylinder group to perform a valve stop control for the intake and exhaust valves of each of the cylinders of the first cylinder group; and a second lift variable mechanism configured to perform a continuously variable control for the lift of the intake valves of each of the cylinders of an all time working second cylinder group and wherein the second lift variable mechanism performs the continuously variable control for the lift of the intake valve of each of the cylinders of the second cylinder group to be increased in order to maintain a variation of an engine torque before and after a zero lift control of the lifts of the intake and exhaust valves of each of the cylinders of the first cylinder group is performed by the first lift variable mechanism at a value equal to or smaller than a predetermined value, when the first lift variable mechanism zeroes the lifts of the intake and exhaust valves of each of the cylinders of the first cylinder group to perform the zero lift control.

(L). According to the present invention, in the control apparatus for the internal combustion engine as set forth in item (K), the internal combustion engine is constituted by a gasoline specified V-type six-cylinder engine, each of the cylinders of the engine is constituted by two of the intake valves and two of the exhaust valves per cylinder and the first cylinder group is a right bank (RB) having three cylinders at a right-side bank and the second cylinder is a left bank (LB) having the remaining three cylinders at a left-side bank.

(M). According to the present invention, in the control apparatus for the internal combustion engine as set forth in item (L), the first lift variable mechanism comprises: a first intake VEL (1) that variably controls the lifts of intake valves of each of the cylinders of the right bank (RB), a first intake VTC (2) that variably controls open-and-closure timings of the intake valves of each of the cylinders of the right bank (RB), and an exhaust VVL (3) that variably controls the lifts of the exhaust valves of each of the cylinders of the right bank (RB) and the second lift variable mechanism comprises a second intake VEL (1') that variably controls the lifts of the intake valves of each of the cylinders of the left bank (LB) and a second intake VTC (2') that variably controls the open-and-closure timings of the intake valves of each of the cylinders of the left bank (LB).

(N). According to the present invention, in the control apparatus for the internal combustion engine as set forth in item (M), the controller further comprises an engine driving region determining section configured to determine within which engine driving region a present engine driving condition falls and wherein, when the engine driving region determining section determines that the present engine driving condition is transferred into a transition region from a predetermined light load driving region (A) to a predetermined low-or-middle load region (B), the lift (Lr2) of each of the intake valves of the right bank (RB) is made approximately equal to the lift (Ll2) of each of the intake valves of the left bank (LB) and the valve closure timing (IVC) of each of the intake valves of the right bank (RB) is approximately equal to that of the left bank (LB) and, thereafter, the lift (Lr3) of each of the intake valves of the right bank (RB) is zeroed, the lift (Ll3) of each of the intake valves of the left bank (LB) is made larger to increase an intake quantity of the engine, the valve-closure timing of each of the intake valves of the right bank (RB) is retarded toward a bottom dead center, and the valve-closure timing of each of the intake valves of the left bank (LB) is advanced toward a maximum advance angle with respect to the bottom dead center.

(O). According to the present invention, in the control apparatus for the internal combustion engine as set forth in item (N), when the engine driving region determining section determines that the present engine driving condition falls within the predetermined light load driving region, the controller carries out a lean burn control for air-fuel mixture supplied to the engine to be leaner than a stoichiometric air-fuel ratio.

(P). According to the present invention, in the control apparatus for the internal combustion engine as set forth in item (O), when the engine driving region determining section determines that the present engine driving section is transferred into a second transition region from the predetermined low-or-middle driving region (B) to a predetermined high-load-and-high-revolution region (C), the lift (Lr4) of each of the intake valves of the right bank (RB) which is zeroed is switched to a smaller value (Lr5), the lift (Ll4) of each of the intake valves of the left bank (LB) is reduced to a predetermined lift value (Ll5) which is approximately equal to the smaller lift value (Lr5) of each of the intake valves of the right bank (RB), the valve closure timing of each of the intake valves of the right bank (RB) is switched from the maximum advance angle (Tr4) to a predetermined retardation angle (Tr5) with respect to the bottom dead center, and the valve closure timing of each of the intake valves is switched from a predetermined retardation angle with respect to the bottom dead center to approximately the same value of the predetermined retardation angle (Tr5) of the right bank.

(Q). According to the present invention, in the control apparatus as set forth in item (P), a first hysterisis is provided for the lifts (Lr2, Lr3) of each of the intake valves of the right bank (RB) and for the lifts (Ll2, Ll3) of each of the intake valves of the left bank (LB) to make predetermined different values in cases where the engine driving region determining section determines that the present engine driving condition is transferred into the first transition region from the predetermined high-load driving region (A) to the predetermined low-or-middle driving region (B) and where the engine driving region determining section determines that the present engine driving condition is transferred into the first transition region from the predetermined low-or-middle driving region (B) to the predetermined light load driving region (A) and a second hysterisis is provided for the lifts (Lr4, Lr5) of each of the intake valves of the right bank (RB) and for the lifts (Ll4, Ll5) of each of the intake valves of the left bank (LB) to make different values in cases where the engine driving region determining section determines that the present engine driving condition is transferred into the second transition region from the predetermined low-or-middle driving region (B) to the predetermined high-load-and-high-revolution driving region (C) and where the engine driving region determining section determines that the present engine driving condition is transferred into the second transition region from the predetermined high-load-and-high-revolution driving region (C) to the predetermined low-or-middle driving region (B).

(R). According to the present invention, in the control apparatus for the internal combustion engine as set forth in item (N), a width ($\Delta F$) of the second hysterisis is narrower than a width ($\Delta E$) of the first hysterisis.

(S). According to the present invention, in the control apparatus for the internal combustion engine as set forth in item (N), the predetermined light load includes an engine idling and the present engine driving condition is determined according to an engine load and an engine revolution.

This application is based on prior Japanese Patent Applications No. 2007-175718 and 2007-227435. The entire contents of Japanese Patent Applications No. 2007-175718 and 2007-227435 with filing dates of Jul. 4, 2007 and Sep. 3, 2007 are hereby incorporated by reference. Although the invention has been described above by reference to certain embodiments of the invention, the invention is not limited to the embodiment described above. Modifications and variations of the embodiments described above will occur to those skilled in the art in light of the above teachings. The scope of the invention is defined with reference to the following claims.

What is claimed is:

1. A control apparatus for an internal combustion engine, comprising:
    a first cylinder group in which both of intake and exhaust valves of each of engine cylinders thereof are controllably stopped;
    a second cylinder group in which a lift of an intake valve of each of the engine cylinders thereof is variably controlled; and
    a controller configured to control the lift of the intake valve of each of the engine cylinders of the second cylinder group such that an engine torque when the intake and exhaust valves of each of the engine cylinders of the first cylinder group are controlled to be stopped is equal to an engine torque by the first cylinder group and the second cylinder group before the intake and exhaust valves of each of the engine cylinders of the first cylinder group are controlled to be stopped.

2. The control apparatus for the internal combustion engine as claimed in claim 1, wherein the controller is configured to perform a valve stop control such that lifts of the intake and exhaust valves of each of the engine cylinders of the first cylinder group are zeroed when an engine revolution is raised from a predetermined light load driving region or an engine load is raised from a predetermined light load driving region.

3. The control apparatus for the internal combustion engine as claimed in claim 1, wherein the controller is configured to set a number of the engine cylinders of the first cylinder group to be the same as a number of the engine cylinders of the second cylinder group,
    wherein the controller is configured to perform a valve stop control for the intake and exhaust valves of each of the engine cylinders of the first cylinder group so as to make each of lifts of the intake and exhaust valves of each of the engine cylinders of the first cylinder group in a zero state, and
    wherein the controller is configured to control a time area of the lift of the intake valve of each of the engine cylinders of the second cylinder group to be equal to a sum of a time area of the lift of the intake valve of each of the engine cylinders of the first cylinder group before the valve stop control and a time area of the lift of the intake valve of each of the engine cylinders of the second cylinder group before the valve stop control.

4. The control apparatus for the internal combustion engine as claimed in claim 1, wherein the controller is configured to control a valve open timing of the intake valve of each of the engine cylinders of the second cylinder group after a valve stop control for the intake and exhaust valves of each of the engine cylinders of the first cylinder group so as to be made coincident with a valve open timing of the intake valve of each of the engine cylinders of the second cylinder group before the valve stop control while increasing lift of the intake valve of each of the engine cylinders of the second cylinder group and, simultaneously, controlling a valve closure timing of the intake valve of each of the engine cylinders of the second cylinder group so as to be directed toward a retardation angle side greater than a valve closure timing of the intake valve of each of the engine cylinders of the second cylinder group before the valve stop control.

5. The control apparatus for the internal combustion engine as claimed in claim 1, wherein the controller is configured to switchingly control an engine driving region to be an all cylinder driving region such that a valve stop control for the intake and exhaust valves of each of the engine cylinders of the first cylinder group to be zeroed is not performed under a predetermined light load state of the engine.

6. The control apparatus for the internal combustion engine as claimed in claim 5, wherein the controller is configured to control an air-fuel ratio of the engine toward a leaner side with respect to a stoichiometric air-fuel ratio under the predetermined light load state of the engine.

7. The control apparatus for the internal combustion engine as claimed in claim 1, wherein the controller comprises:
    a first lift variable mechanism configured to zero lifts of both of the intake and exhaust valves of the engine cylinders of the first cylinder group so as to perform a valve stop control for the intake and exhaust valves of each of the engine cylinders of the first cylinder group; and
    a second lift variable mechanism configured to perform a continuously variable control for the lift of the intake valve of each of the engine cylinders of the second cylinder group,
    wherein the engine cylinders of the second cylinder group are all-time working cylinders, and
    wherein the second lift variable mechanism is configured to perform the continuously variable control for the lift of the intake valve of each of the engine cylinders of the second cylinder group so as to be increased in order to maintain a variation of an engine torque before and after a zero lift control of lifts of the intake and exhaust valves of each of the cylinders of the first cylinder group is performed by the first lift variable mechanism at a value equal to or smaller than a predetermined value, when the first lift variable mechanism zeroes the lifts of the intake and exhaust valves of each of the engine cylinders of the first cylinder group so as to perform the zero lift control.

8. The control apparatus for the internal combustion engine as claimed in claim 7, wherein the internal combustion engine comprises a gasoline specified V-type six-cylinder engine,
    wherein each of the engine cylinders of the first and second cylinder groups comprises two intake valves and two exhaust valves; and
    wherein the first cylinder group is a right bank having three cylinders and the second cylinder group is a left bank having three cylinders.

9. The control apparatus for the internal combustion engine as claimed in claim 8, wherein the first lift variable mechanism comprises: a first intake VEL configured to variably control the lifts of intake valves of each of the engine cylinders of the right bank, a first intake VTC configured to variably control open-and-closure timings of the intake valves of each of the engine cylinders of the right bank, and an exhaust VVL configured to variably control the lifts of the exhaust valves of each of the engine cylinders of the right bank; and
    wherein the second lift variable mechanism comprises: a second intake VEL configured to variably control the lifts of the intake valves of each of the engine cylinders of the left bank, and a second intake VTC configured to variably control open-and-closure timings of the intake valves of each of the engine cylinders of the left bank.

10. The control apparatus for the internal combustion engine as claimed in claim 9, wherein the controller further comprises an engine driving region determining section configured to determine within which engine driving region a present engine driving condition falls, and wherein, when the engine driving region determining section determines that the present engine driving condition is transferred into a first transition region when changing from a predetermined light load driving region to a predetermined low-or-middle load driving region, the controller is configured such that:

the lift of each of the intake valves of the engine cylinders of the right bank is made equal to the lift of each of the intake valves of the engine cylinders of the left bank and the valve closure timing of each of the intake valves of the engine cylinders of the right bank is equal to that of the left bank and, thereafter, the lift of each of the intake valves of the engine cylinders of the right bank is zeroed, the lift of each of the intake valves of the engine cylinders of the left bank is made larger to increase an intake quantity of the engine, the valve-closure timing of each of the intake valves of the engine cylinders of the right bank is retarded toward a bottom dead center, and the valve-closure timing of each of the intake valves of the engine cylinders of the left bank is advanced toward a maximum advance angle with respect to the bottom dead center.

11. The control apparatus for the internal combustion engine as claimed in claim 10, wherein, when the engine driving region determining section determines that the present engine driving condition falls within the predetermined light load driving region, the controller is configured to carry out a lean burn control for air-fuel mixture supplied to the engine to be leaner than a stoichiometric air-fuel ratio.

12. The control apparatus for the internal combustion engine as claimed in claim 10, wherein, when the engine driving region determining section determines that the present engine driving condition is transferred into a second transition region when changing from the predetermined low-or-middle load driving region to a predetermined high-load-and-high-revolution driving region, the controller is configured such that:

the lift of each of the intake valves of the engine cylinders of the right bank which is zeroed is switched to a smaller value, the lift of each of the intake valves of the engine cylinders of the left bank is reduced to a predetermined lift value which is equal to the smaller value of each of the intake valves of the engine cylinders of the right bank, the valve closure timing of each of the intake valves of the engine cylinders of the right bank is switched from the maximum advance angle to a predetermined retardation angle with respect to the bottom dead center, and the valve closure timing of each of the intake valves of the engine cylinders of the left bank is switched from a predetermined retardation angle with respect to the bottom dead center to the same value of the predetermined retardation angle of the right bank.

13. The control apparatus for the internal combustion engine as claimed in claim 10, wherein a first hysteresis is provided for the lifts of each of the intake valves of the engine cylinders of the right bank and for the lifts of each of the intake valves of the engine cylinders of the left bank so as to have predetermined different values in cases where the engine driving region determining section determines that the present engine driving condition is transferred into the first transition region when changing from the predetermined light load driving region to the predetermined low-or-middle driving region and where the engine driving region determining section determines that the present engine driving condition is transferred into the first transition region when changing from the predetermined low-or-middle driving region to the predetermined light load driving region; and wherein a second hysteresis is provided for the lifts of each of the intake valves of the engine cylinders of the right bank and for the lifts of each of the intake valves of the engine cylinders of the left bank so as to have different values in cases where the engine driving region determining section determines that the present engine driving condition is transferred into the second transition region when changing from the predetermined low-or-middle driving region to the predetermined high-load-and-high-revolution driving region and where the engine driving region determining section determines that the present engine driving condition is transferred into the second transition region when changing from the predetermined high-load-and-high-revolution driving region to the predetermined low-or-middle driving region.

14. The control apparatus for the internal combustion engine as claimed in claim 13, wherein a width of the second hysteresis is narrower than a width of the first hysteresis.

15. The control apparatus for the internal combustion engine as claimed in claim 10, wherein a predetermined light load of the predetermined light load driving region includes an engine idling and the present engine driving condition is determined according to an engine load and an engine revolution.

16. A control apparatus for an internal combustion engine, comprising:

a first control mechanism configured to perform a valve stop control for intake and exhaust valves for each of a plurality of engine cylinders of a first cylinder group; and a second control mechanism configured to perform a variable control for a lift of an intake valve of each of a plurality of engine cylinders of a second cylinder group, wherein, when the first control mechanism performs the valve stop control for the intake and exhaust valves of each of the engine cylinders of the first cylinder group, the second control mechanism is configured to perform the lift of the intake valve of each of the engine cylinders of the second cylinder group so as to maintain an engine torque by the first and second cylinder groups before the valve stop control is performed by the first control mechanism.

17. A control apparatus for an internal combustion engine, comprising:

a first lift variable mechanism configured to zero lifts of both of intake and exhaust valves of a first cylinder group of engine cylinders so as to perform a valve stop control for the intake and exhaust valves of each of the engine cylinders of the first cylinder group; and a second lift variable mechanism configured to perform a continuously variable control for lift of intake valves of a plurality of engine cylinders of an all time working second cylinder group, and wherein the second lift variable mechanism is configured to perform the continuously variable control for the lift of the intake valve of each of the engine cylinders of the second cylinder group so as to be increased in order to maintain a variation of an engine torque before and after a zero lift control of the lifts of the intake and exhaust valves of each of the engine cylinders of the first cylinder group is performed by the first lift variable mechanism at a value equal to or smaller than a predetermined value, when the first lift variable mechanism zeroes the lifts of the intake and exhaust valves of each of the engine cylinders of the first cylinder group so as to perform the zero lift control.

18. The control apparatus for the internal combustion engine as claimed in claim 17, wherein the first lift variable mechanism is provided with a first control section configured to continuously vary the lift of the intake valve of each of the engine cylinders of the first cylinder group with a driving force and to hold the lift of the intake valve of each of the engine cylinders of the first cylinder group at a predetermined middle lift position mechanically not a zero lift in a case where no driving force is given.

19. The control apparatus for the internal combustion engine as claimed in claim 17, wherein the second lift variable mechanism comprises a second control section configured to variably control the lift of the intake valve of each of the engine cylinders of the second cylinder group with a driving force and a stopper section configured to limit the lift of the intake valve of each of the cylinders of the second cylinder group at a position at which the lift of the intake valve of each of the engine cylinders of the second cylinder group provides a predetermined small lift in a case where no driving force is given.

20. A control method for an internal combustion engine, comprising:

providing a first cylinder group with engine cylinders in which both of intake and exhaust valves of each of the engine cylinders of the first cylinder group are controllably stopped;

providing a second cylinder group with engine cylinders in which a lift of an intake valve of each of the engine cylinders of the second cylinder group is variably controlled; and controlling the lift of the intake valve of each of the engine cylinders of the second cylinder group in order for an engine torque when the intake and exhaust valves of each of the cylinders of the first cylinder group are controlled to be stopped to be equal to an engine torque by the first cylinder group and the second cylinder group before the intake and exhaust valves of each of the cylinders of the first cylinder group are controlled to be stopped.

* * * * *